(12) United States Patent
Vogelsang et al.

(10) Patent No.: US 12,026,104 B2
(45) Date of Patent: Jul. 2, 2024

(54) MULTIPLE PRECISION MEMORY SYSTEM

(71) Applicant: Rambus Inc., San Jose, CA (US)

(72) Inventors: Thomas Vogelsang, Mountain View, CA (US); Craig E. Hampel, Los Altos, CA (US)

(73) Assignee: Rambus Inc., San Jose, CA (US)

( * ) Notice: Subject to any disclaimer, the term of this patent is extended or adjusted under 35 U.S.C. 154(b) by 175 days.

(21) Appl. No.: 17/438,844

(22) PCT Filed: Mar. 19, 2020

(86) PCT No.: PCT/US2020/023584
§ 371 (c)(1),
(2) Date: Sep. 13, 2021

(87) PCT Pub. No.: WO2020/197925
PCT Pub. Date: Oct. 1, 2020

(65) Prior Publication Data
US 2022/0147468 A1    May 12, 2022

Related U.S. Application Data

(60) Provisional application No. 62/875,176, filed on Jul. 17, 2019, provisional application No. 62/824,049, filed on Mar. 26, 2019.

(51) Int. Cl.
G06F 13/16    (2006.01)
G06F 7/483    (2006.01)

(52) U.S. Cl.
CPC .......... *G06F 13/1605* (2013.01); *G06F 7/483* (2013.01)

(58) Field of Classification Search
CPC .. G06F 13/1605; G06F 7/483; G06F 12/0207; G06F 2212/1008;
(Continued)

(56) References Cited

U.S. PATENT DOCUMENTS

RE33,629 E * 7/1991 Palmer .................. G06F 9/3885
708/496
6,151,239 A   11/2000 Batra
(Continued)

FOREIGN PATENT DOCUMENTS

CN    104145245 A     11/2014
DE    102004050037 B4   1/2015

OTHER PUBLICATIONS

Notification of Transmittal of the International Search Report and the Written Opinion of the International Searching Authority, or the Declaration dated Jul. 31, 2020 re: Int'l Appln. No. PCT/US2020/023584. 59 pages.
(Continued)

*Primary Examiner* — Faisal M Zaman
(74) *Attorney, Agent, or Firm* — The Neudeck Law firm, LLC

(57) ABSTRACT

Space in a memory is allocated based on the highest used precision. When the maximum used precision is not being used, the bits required for that particular precision level (e.g., floating point format) are transferred between the processor and the memory while the rest are not. A given floating point number is distributed over non-contiguous addresses. Each portion of the given floating point number is located at the same offset within the access units, groups, and/or memory arrays. This allows a sequencer in the memory device to successively access a precision dependent number of access units, groups, and/or memory arrays without receiving additional requests over the memory channel.

20 Claims, 27 Drawing Sheets

(58) Field of Classification Search
CPC ......... G06F 2212/1044; G06F 12/0223; G06F 12/0284; G06F 13/16; G06N 3/04; G06N 3/063; G06N 3/084
See application file for complete search history.

(56) References Cited

U.S. PATENT DOCUMENTS

| | | | | |
|---|---|---|---|---|
| 6,226,737 | B1* | 5/2001 | Elliott | ............ G06F 7/523 708/503 |
| 6,442,656 | B1 | 8/2002 | Alasti et al. | |
| 6,825,841 | B2 | 11/2004 | Hampel et al. | |
| 7,167,947 | B2 | 1/2007 | Rotithor et al. | |
| 7,469,316 | B2 | 12/2008 | Dodd | |
| 7,505,356 | B2* | 3/2009 | Ware | ............ G11C 8/12 365/189.04 |
| 8,635,417 | B2 | 1/2014 | Morrison et al. | |
| 8,886,844 | B2 | 11/2014 | Jandhyam et al. | |
| 9,335,934 | B2 | 5/2016 | Luan et al. | |
| 9,354,823 | B2 | 5/2016 | Miller et al. | |
| 10,417,218 | B2* | 9/2019 | Doshi | ............ G06F 9/466 |
| 10,644,721 | B2* | 5/2020 | Bajic | ............ H03M 7/3066 |
| 2004/0189651 | A1* | 9/2004 | F. Zatz | ............ G06T 1/20 345/531 |
| 2016/0004477 | A1* | 1/2016 | Okada | ............ G06F 13/1605 710/5 |
| 2018/0211152 | A1* | 7/2018 | Migacz | ............ G06N 3/04 |
| 2019/0205244 | A1* | 7/2019 | Smith | ............ G06F 3/065 |
| 2022/0147468 | A1* | 5/2022 | Vogelsang | ............ G06F 13/1605 |
| 2022/0292083 | A1* | 9/2022 | Mu | ............ G06F 16/25 |

OTHER PUBLICATIONS

CN Office Action with Mail Date Feb. 8, 2024 re: CN Appln. No. 202080006598.9. 11 pages.

* cited by examiner

MULTIPLE PRECISION MEMORY SYSTEM

DETAILED DESCRIPTION OF THE EMBODIMENTS

Different steps and/or operations during machine learning may use different levels of precision. As used herein, precision is the number of digits in a number (e.g., number of bits in a binary number—either fixed point or floating point.) Various number formats may have various numbers of bits. Examples of number precisions include: a single bit (e.g., just a sign bit), five or six bits (e.g., just an exponent or exponent with a sign bit), 32-bits (e.g., 23 bits of significand, a sign bit, and 8 bits of exponent—IEEE 754 standard single precision), 64 bits (e.g., 52 bits of significand, a sign bit, and 11 bits of exponent—IEEE 754 standard double precision), and others (e.g., any number of, or combination of, sign, exponent, and/or significand bits.)

In an example, training a neural network may use higher precision numbers (integer or floating) during the training calculations for the network than the precision used for the inference calculations using the trained network. Likewise, for example, matrix multiplication calculations may create a higher precision outputs after thresholding lower precision inputs. Finally, for example, higher precision numbers may be used for backpropagation calculations than are used for forward propagation calculations.

In an embodiment, space in a memory is allocated based on the highest used precision. When the maximum used precision is not being used, the bits required for that particular precision level (e.g., floating point format) are transferred between the processor and the memory while the rest are not. This saves memory bandwidth, power, and processor resources.

In an embodiment, storage formats for the various precision levels are selected to be efficiently stored and retrieved from memory devices. In particular, a given floating point number and is components are distributed over non-contiguous addresses. The non-contiguous addresses for a given floating point number are located in more than one memory access unit, group, and/or memory array. In an embodiment, each portion of the given floating point number is located at the same offset within the access units, groups, and/or memory arrays. This allows a sequencer in the memory device to successively (or simultaneously) access a precision dependent number of access units, groups, and/or memory arrays without receiving additional requests over the memory channel. In an embodiment, the most significant bits (MSBs) of the floating point numbers are stored such that the MSBs are accessed before bits of lesser significance.

Figure 1A:
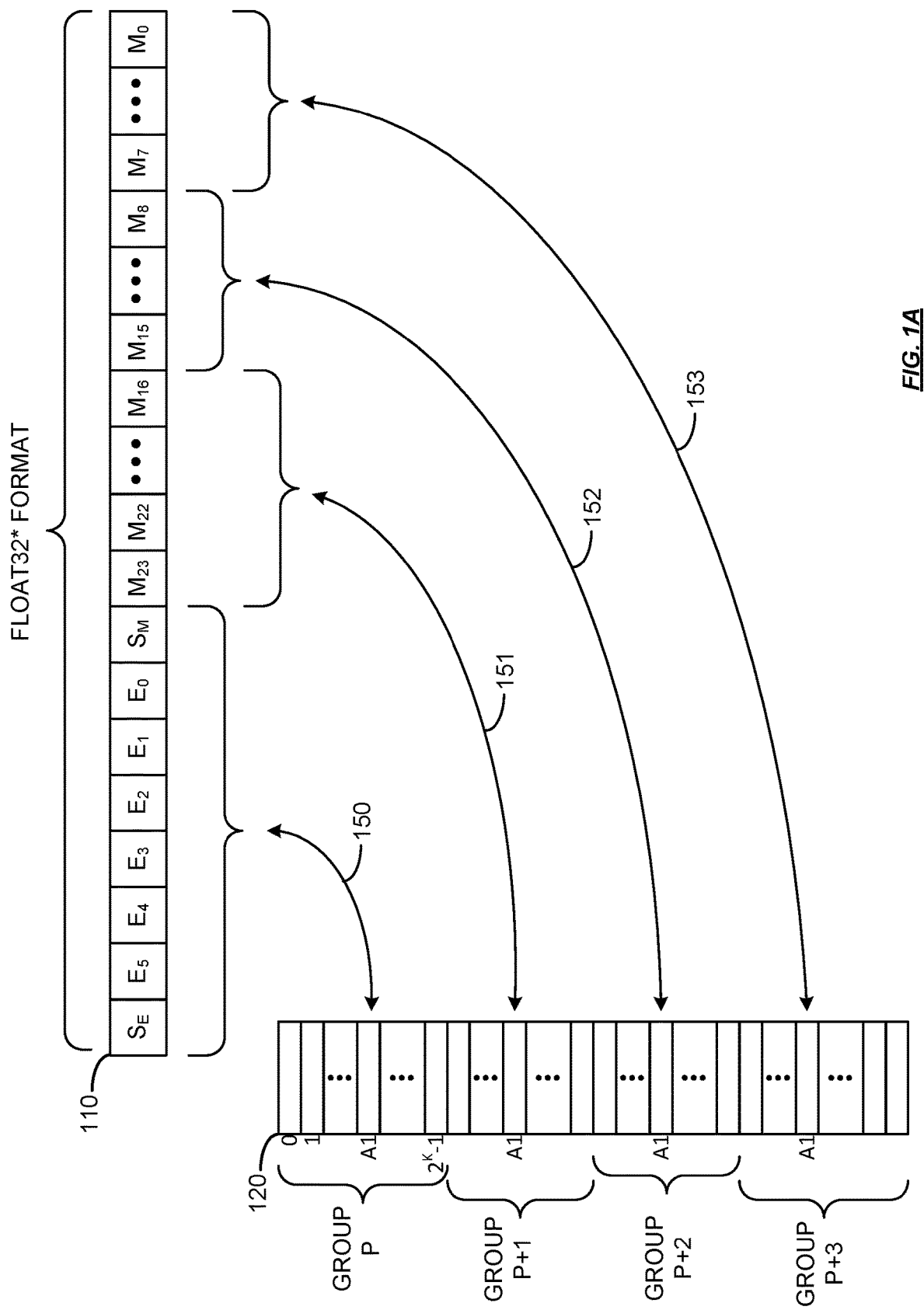
FIGS. 1A-1D are diagrams illustrating example storage formats for floating point numbers having different precisions.

FIGS. 1A-1D are diagrams illustrating example storage formats for floating point numbers having different precisions. In FIG. 1A, an example format for a 32-bit floating point number is shown. This example format is labeled FLOAT32*110. The 32-bit floating point number includes 32 bits stored in 4 bytes. The most significant byte includes one bit SE for the sign of the exponent, 6 bits ($E_5$-$E_0$) of exponent, and one bit for the sign of the mantissa SM. The next most significant byte includes the most significant 8 bits (not including the sign) of the mantissa ($M_{23}$-$M_{16}$). The next most significant byte includes bits $M_{15}$ to $M_8$ of the mantissa. Finally, the least significant byte of the 32-bit floating point number includes bits $M_7$-$M_0$ of the mantissa.

It should be understood that the selection and placement of the sign bits, the exponent bits, and the mantissa bits is merely an example, Other numbers of bits and placements of those bits is contemplated. For example, the most significant byte may include fewer (e.g., 4) exponent bits and include more (e.g., 2) mantissa bits.

In an embodiment, each of the bytes of FLOAT32* format floating point number 110 are stored in different access units of memory 120. This is illustrated in FIG. 1A by arrow 150 running from the most significant byte of floating point number 110 to location A1 in group P of memory 120; arrow 151 running from the $2^{nd}$ most significant byte of number 110 to location A1 of group P+1 of memory 120; arrow 152 running from the $3^{rd}$ most significant byte of number 110 to location A1 of group P+2 of memory 120; and, arrow 153 running from the least significant byte of number 110 to location A1 of group P+3 of memory 120.

The access units (groups) of memory 120 may be, for example, selected for efficient transfer of the FLOAT32* format numbers and/or their constituent sub-bytes. For example, if memory 120 has a burst size of 64 bytes, locating each of the respective bytes of 64 FLOAT32* format floating point numbers 110 in different 64 byte groups would allow the respective bytes to be retrieved/stored by different bursts. This allows the most significant byte (i.e., the exponent and sign of the mantissa) of 64 of the 32-bit floating-point numbers to be retrieved by a first burst for processing. Bits $M_{23}$-$M_{16}$ of the mantissa to be retrieved/stored by a second burst, and so on. If a number of remaining bytes of the mantissa of those 64 floating-point numbers were not needed (e.g., only the most significant byte was necessary to determine whether the numbers were positive, negative, or not a number—NaN) the subsequent bursts need not be performed.

Other group sizes (e.g., $2^k-1$) may be selected depending upon the architecture of memory 120. For example, the access unit groups may be selected to correspond to the column access width or page size of the arrays of memory 120, or a multiple or division by a power of two thereof. For example, for a page size of 2 kB, the access unit (group) size selected may be 2 kB/32=64B thereby storing the exponent portion of a first group of 64 floating point numbers in the first 64 bytes of the page, the next most significant byte in the second 64 bytes, etc., with a second group of 64 floating point numbers starting at byte 64*4=256 of the page, and so on for 8 groups of 64 floating point numbers being stored per page of memory 120.

Figure 1B:
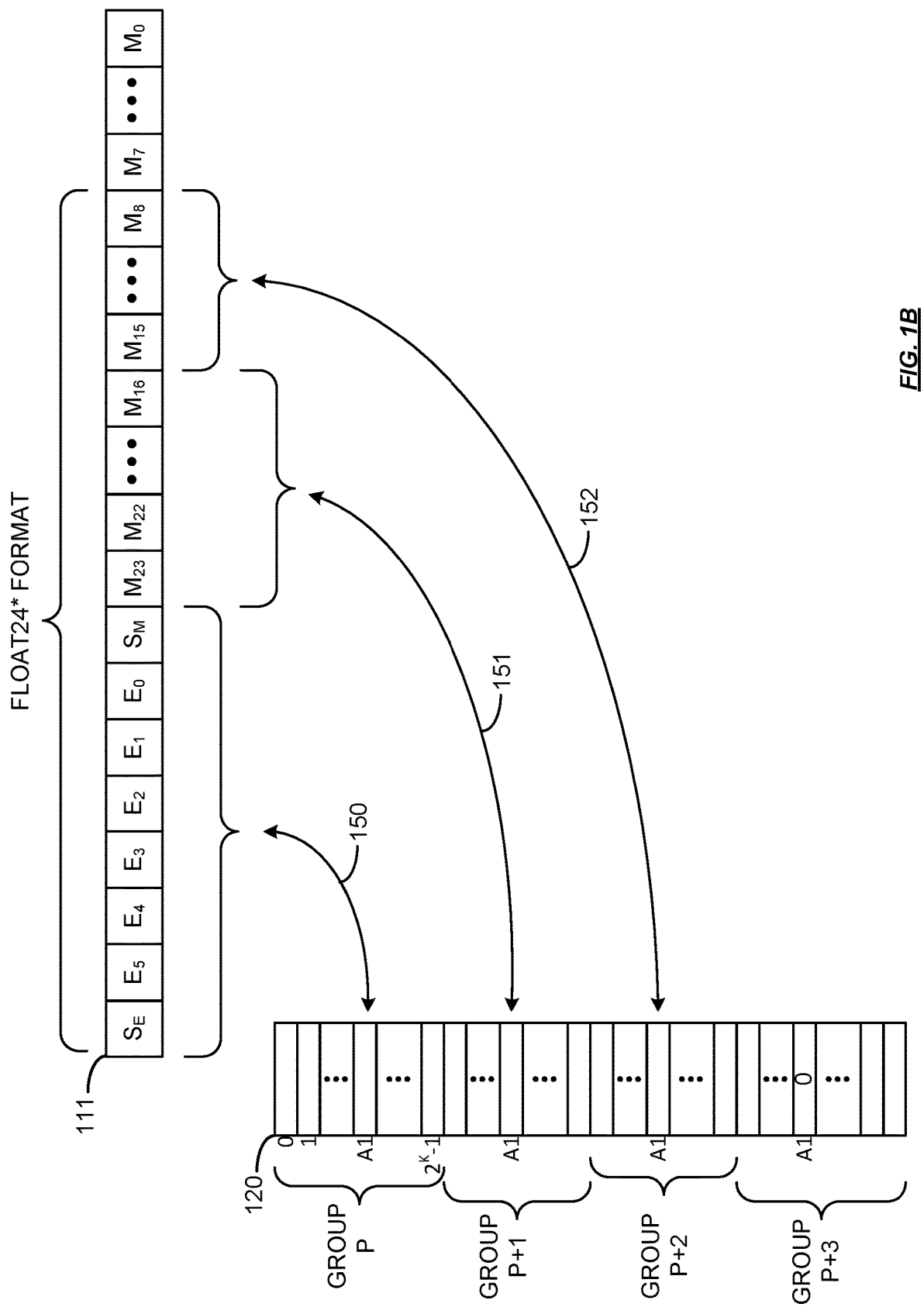

In FIG. 1B, an example format for a 24-bit floating point number is shown. This example number is labeled FLOAT24* 111. The 24-bit floating point number includes 3 bytes. The most significant byte includes one bit SE for the sign of the exponent, 6 bits ($E_5$-$E_0$) of exponent, and one bit for the sign of the mantissa SM. The next most significant byte includes the most significant 8 bits (not including the sign) of the mantissa ($M_{23}$-$M_{16}$). Finally, the least significant byte includes bits $M_{15}$ to $M_8$ of the mantissa. Thus, it should be understood that the FLOAT24* format is equivalent to the FLOAT32* format with the least significant byte ($M_7$-$M_0$) of the mantissa being truncated (e.g., set to 0x00h).

In an embodiment, each of the bytes of FLOAT24* format floating point number 111 are stored in different access units of memory 120. These bytes/bits are stored in the same access group and locations as their (untruncated) counterparts in a FLOAT32* number would be stored. This is illustrated in FIG. 1B by arrow 150 running from the most significant byte of floating point number 111 to location A1 in group P of memory 120; arrow 151 running from the $2^{nd}$ most significant byte of number 111 to location A1 of group P+1 of memory 120; and, arrow 152 running from the $3^{rd}$ most significant byte of number 111 to location A1 of group P+2 of memory 120. Location A1 in group P+3, where the least significant byte of a FLOAT32* number would be stored, may optionally be set to 0x00h. This is illustrated in FIG. 1B by the '0' in location A1 of group P+3.

The placement of each byte of the FLOAT24* numbers in the same location and access group as FLOAT32* numbers allows the same access pattern to be used for both FLOAT32* numbers and the lower precision FLOAT24* numbers—except that the last access/burst (i.e., to retrieve/store the least significant byte) need not be performed. This allows the FLOAT24* numbers to be retrieved using 3 bursts instead of the 4 bursts needed for the float 32* numbers. Thus, the most significant bytes of 64 of the 24-bit floating-point numbers can be retrieved/stored by a first burst; bits $M_{23}$-$M_{16}$ of the mantissa retrieved/stored by a second burst; and, bits $M_{15}$-$M_8$ retrieved/stored by a third burst. A fourth burst need not be performed for the FLOAT24* format numbers—thereby saving memory channel bandwidth/cycles.

Figure 1C:
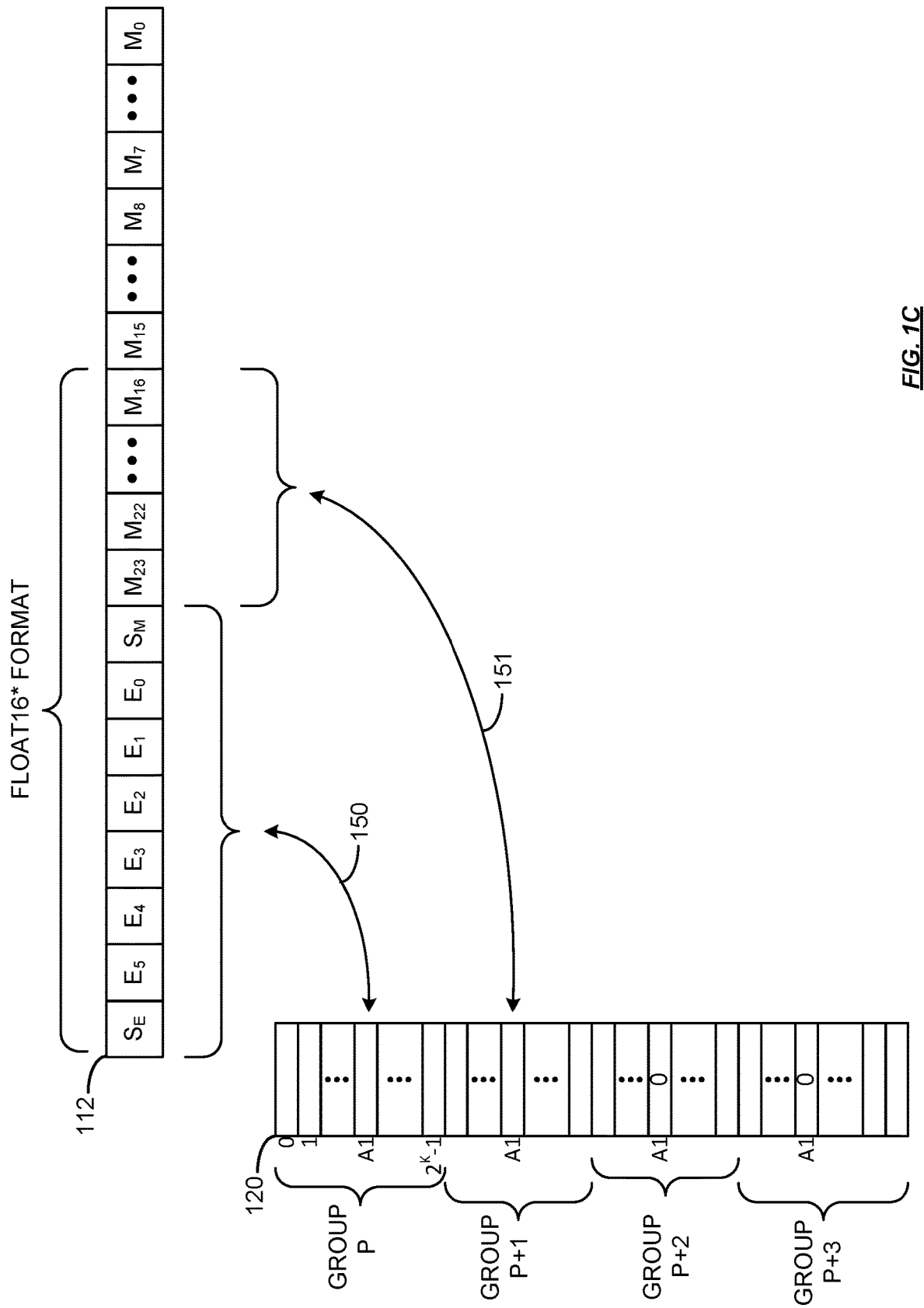

In FIG. 1C, an example format for a 16-bit floating point number is shown. This example number is labeled FLOAT16* 112. The 16-bit floating point number includes 2 bytes. Like the FLOAT32* and FLOAT24* formats, the most significant byte includes one bit SE for the sign of the exponent, 6 bits ($E_5$-$E_0$) of exponent, and one bit for the sign of the mantissa SM. The other byte of the FLOAT16* format includes the most significant 8 bits (not including the sign) of the mantissa ($M_{23}$-$M_{16}$). Thus, it should be understood that the FLOAT16* format is equivalent to the FLOAT32* format with the 2 least significant bytes of the mantissa (i.e., $M_{15}$-$M_0$) being truncated (e.g., set to 0x00h), and is equivalent to the FLOAT24* format with the least significant byte of the mantissa (i.e., $M_{15}$-$M_8$) being truncated (e.g., set to 0x00h).

In an embodiment, each of the bytes of FLOAT16* format floating point number 112 are stored in different access units of memory 120. These bytes/bits are stored in the same access group and locations as their (untruncated) counterparts in a FLOAT32* or FLOAT24* number would be stored. This is illustrated in FIG. 1C by arrow 150 running from the most significant byte of floating point number 112 to location A1 in group P of memory 120; and, arrow 151 running from the $2^{nd}$ most significant byte of number 112 to location A1 of group P+1 of memory 120; Location A1 in group P+2 and location A1 in group P+3, where the least significant two bytes of a FLOAT32* number would be stored, may optionally be set to 0x00h. This is illustrated in FIG. 1C by the '0"s in location A1 of groups P+2 and P+3.

The placement of each byte of the FLOAT16* numbers in the same location and access group as FLOAT32* and FLOAT24* numbers allows the same access pattern to be used for FLOAT32* numbers, FLOAT24* numbers, and the lower precision FLOAT16* numbers—except that the last one or two accesses/bursts (i.e., to retrieve/store the 1 or two least significant bytes, as appropriate) need not be performed. This allows the FLOAT16* numbers to be retrieved using 2 bursts instead of the 4 bursts needed for the FLOAT32* numbers. Thus, the most significant bytes of 64 of the 16-bit floating-point numbers can be retrieved/stored by a first burst and the remaining bits $M_{23}$-$M_{16}$ of the mantissa retrieved/stored by a second burst. A third or fourth burst need not be performed for the FLOAT16* format numbers—thereby saving memory channel bandwidth/cycles.

Figure 1D:
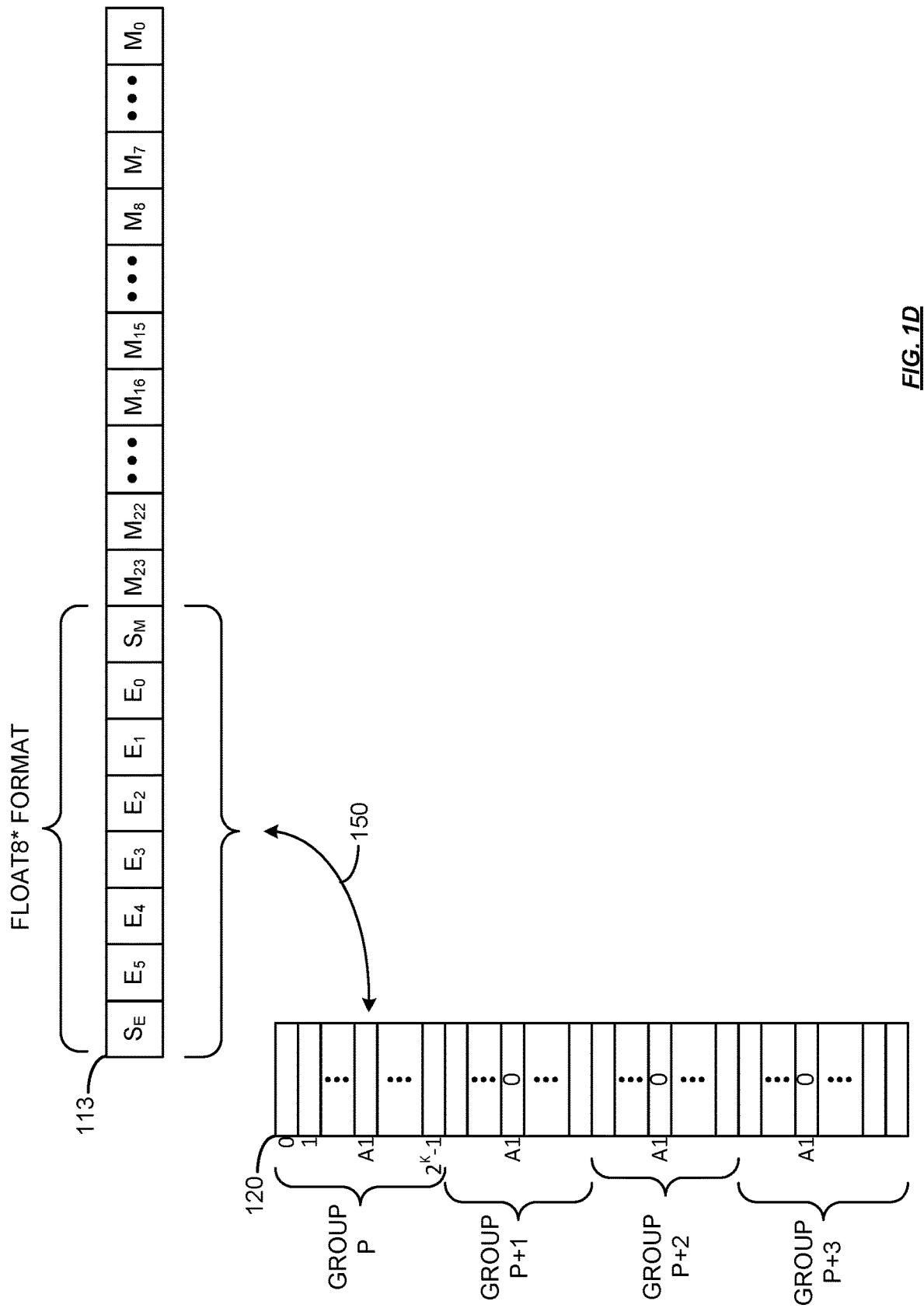

In FIG. 1D, an example format for an 8-bit floating point number is shown. This example number is labeled FLOAT8* 113. The 8-bit floating point number includes 1 byte. 151. Like the FLOAT32*, FLOAT24*, and FLOAT16* formats, the one byte of the FLOAT8* format includes one bit SE for the sign of the exponent, 6 bits ($E_5$-$E_0$) of exponent, and one bit for the sign of the mantissa SM. Thus, it should be understood that the FLOAT8* format is equivalent to the FLOAT32* format with the 3 least significant bytes of the mantissa (i.e., $M_{23}$-$M_0$) being truncated (e.g., set to 0x00h); is equivalent to the FLOAT24* format with the 2 least significant bytes of the mantissa (i.e., $M_{23}$-$M_8$) being truncated (e.g., set to 0x00h); and, is equivalent to the FLOAT16* format with the least significant byte of the mantissa (i.e., $M_{23}$-$M_{16}$) being truncated (e.g., set to 0x00h).

In an embodiment, the bytes of FLOAT8* format floating point numbers 113 are stored in the same access group and locations as their (untruncated) counterparts in a FLOAT32* FLOAT24*, and/or FLOAT16* number would be stored. This is illustrated in FIG. 1D by arrow 150 running from the most significant byte of floating point number 113 to location A1 in group P of memory 120. Location A1 in group P+1, location A1 in group P+2, and location A1 in group P+3, where the least significant 3 bytes of a FLOAT32* number would be stored, may optionally be set to 0x00h. This is illustrated in FIG. 1D by the '0"s in location A1 of groups P+1, P+2, and P+3.

The placement of the byte of the FLOAT8* numbers in the same location and access group as FLOAT32*, FLOAT24*, and FLOAT16* numbers allows the same access pattern to be used for FLOAT32* numbers, FLOAT24* numbers, FLOAT16* numbers, and the lower precision FLOAT8* numbers—except that the last one, two, or three accesses/bursts (i.e., to retrieve/store the one, two, or three least significant bytes, as appropriate) need not be performed. This allows the FLOAT8* numbers to be retrieved using 1 burst instead of the 4 bursts needed for the FLOAT32* numbers. Thus, the most significant bytes of 64 of the 8-bit floating-point numbers can be retrieved/stored by a single burst. A second, third, or fourth burst need not be performed for the FLOAT8* format numbers—thereby saving memory channel bandwidth/cycles.

Figure 2:
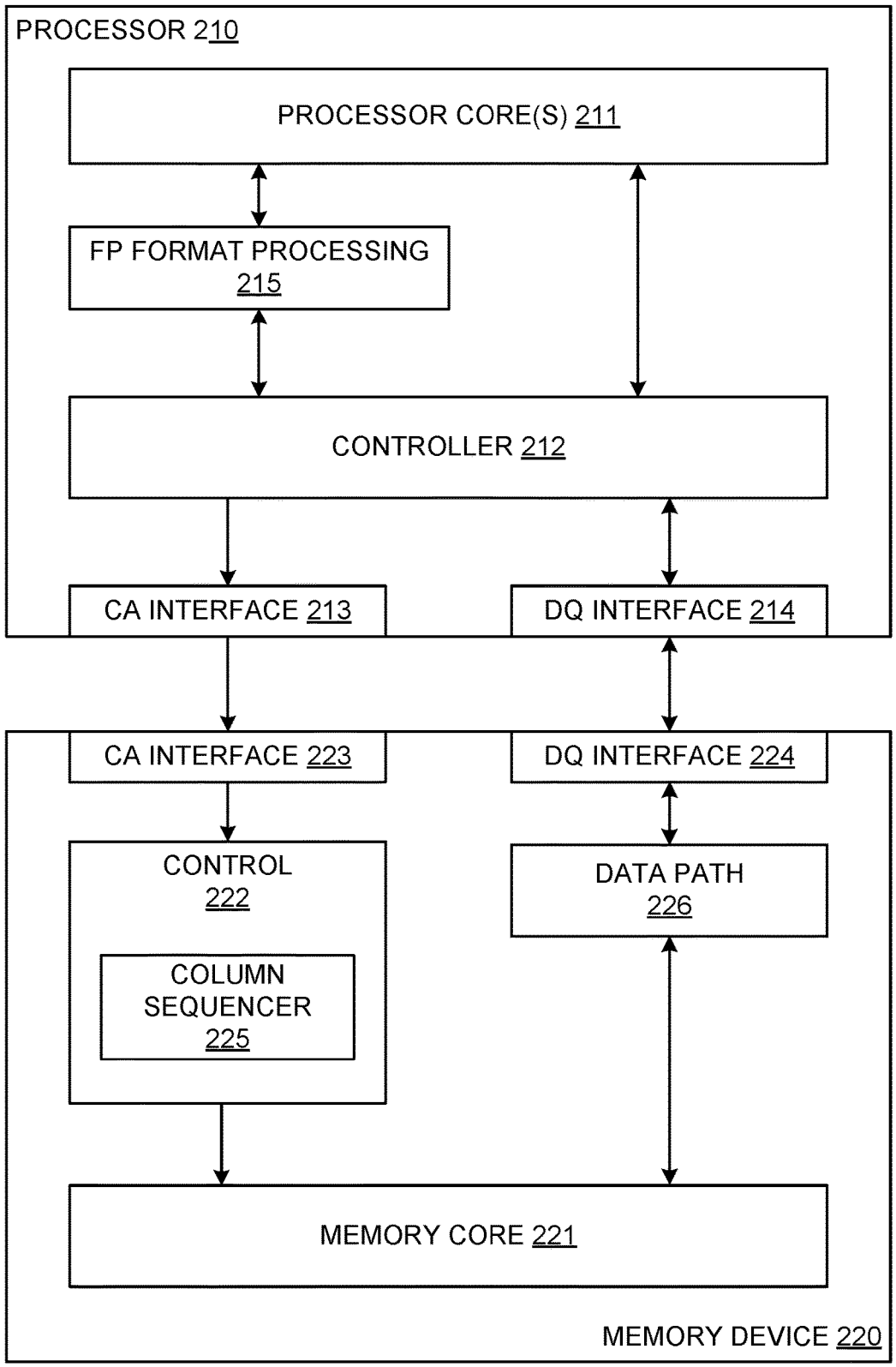
FIG. 2 is a block diagram illustrating a system that processes multiple floating point number formats.

FIG. 2 is a block diagram illustrating a system that processes multiple floating point number formats. In FIG. 2, processing system 200 comprises processor 210 and memory device 220. Processor 210 includes one or more processor cores 211, floating-point format processing 215, controller 212, command address interface 213, and data interface 214. Memory device 220 comprises one or more memory cores 221, command address interface 223, data interface 224, control circuitry 222, and data path circuitry 226. Control circuitry 222 includes column sequencer 225.

Processor core 211 is operatively coupled to floating point format processing 215 and controller 212. Floating-point format processing 215 is operatively coupled to processor core 211 and controller 212. Controller 212 is operatively coupled to processor cores 211, floating-point format processing 215, command address interface 213, and data interface 214.

Command interface 223 of memory device 220 is operatively coupled to the control circuitry 222. Control circuitry 222 is operatively coupled to memory core 221. Memory core 221 is operatively coupled to data path circuitry 226. Data path circuitry 226 is operatively coupled to data interface 224. Command address interface 213 of processor 210 is operatively coupled to command address interface 223 of memory device 220. Data interface 224 of memory device 220 is operatively coupled to data interface 214 of processor 210.

Processor 210 and memory device 220 may be or include integrated circuit type devices, such as are commonly referred to as a "chips". A memory controller, such as controller 212, manages the flow of data going to and from memory devices and/or memory modules. Memory device 220 may be a standalone device, or may be a memory module, or component thereof. For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. For example, as depicted in FIG. 2, memory controller 212 may be included on a single die with one or more processor cores 211, or included as part of a more complex integrated circuit system such as a block of a system on a chip (SOC). Memory device 220 can include a dynamic random access memory (DRAM) core or other type of memory cores, for example, static random access memory (SRAM) cores, or non-volatile memory cores such as flash.

Controller 212 is operatively coupled to memory 220 via at least one command address interface 213. Controller 212 is operatively coupled to memory 220 to send commands to memory 220. Memory 220 receives the commands (and addresses) via a corresponding command address interface 223. Memory 220 communicates data with processor 210 via at least one data interface 224. Processor 210 (and controller 212, in particular) communicates data with memory 220 via a corresponding data interface 214.

Floating point format processing 215 receives floating point numbers from processor core 211. These floating point numbers may have different formats and/or different precisions. Floating point format processing processes (e.g., disassembles) these floating point numbers depending upon their precision. For example, floating point format processing may process floating point numbers having a first precision (e.g., 32-bits) so that these numbers may be stored (e.g., by controller 212) in multiple blocks of bits in non-contiguously addressed locations. For example, the most significant byte of these floating point numbers having the first precision may be stored in a first range of addresses in memory 220; the second most significant byte in a second range of addresses, and so on. Likewise, floating point format processing may process floating point numbers having a second precision (e.g., 16-bits) so that these numbers may be stored (e.g., by controller 212) in a subset of the blocks of bits in non-contiguously addressed locations used to store numbers at the first precision. Thus, the subset of blocks used to store a given second precision number correspond to a second precision version of a corresponding first precision floating point number. Multiple non-contiguously addressed locations that correspond to a set of floating point numbers at a selected precision may be assembled by floating point format processing into a contiguously addressed block of data (e.g., burst, page, etc.) to be stored by controller 212 (using CA interface 213 and CA interface 223) into memory device 220 via data (DQ) interface 214 and DQ interface 224.

For example, each of the bytes of a FLOAT32* format floating point number may be stored in different access units (e.g., groups and/or memory address range) of memory 220. A set of multiple FLOAT32* numbers may be assembled so that a first transaction (e.g., burst) stores all of the respective most significant bytes of the set of FLOAT32* numbers in a single transaction to a first access unit. A second transaction may then store the respective second most significant bytes to second access unit, and so on.

In an embodiment, memory device 220 (and column sequencer 225, in particular) is configured (and/or commanded) to receive the first transaction and then generate internal accesses for the subsequent lesser significant bytes without receiving additional transactions. For example, controller 212 may configure (and/or send a command to) memory device 220 with an indicator of the precision (e.g., number of bytes) that each floating point number consists of. This indicator may determine the number of access units that memory device 220 is to store in memory core 221 before a new transaction address is required. In other words, memory device 220 may be configured (and/or commanded) to store sets of FLOAT32* numbers with each byte of the individual FLOAT32* numbers being stored in a different access unit. Thus, controller 212 can transmit a first address to memory device 220 indicating where (e.g., group P) the first bytes (e.g., most significant) of each of the set of FLOAT32* floating point numbers are to be stored. Subsequently, the second bytes of (e.g., next most significant) of each of the set of floating point numbers may be sent via DQ interface 214 and stored without a new address being specified via CA interface 223 because memory device 220 has been configured (and/or commanded) with both the size of the access unit (e.g., a burst size) and the number of bytes in a FLOAT32* number (4). Column sequencer 225 functions to generate the internal addressing of memory core 221 that stores the various bytes of the FLOAT32* format numbers in the appropriate access unit (e.g., P, P+1, etc.) without receiving a new address for each burst. In some embodiments the sequencer is also able to perform address modification where portions of the memory array simultaneously receive unique addresses, or address offsets that depend on the data format being requested by the controller.

Similarly, memory device 220 may be configured (and/or commanded) to store sets of FLOAT16* numbers with each byte of the individual FLOAT16* numbers being stored in a different access unit. Thus, controller 212 can transmit a first address to memory device 220 indicating where (e.g., group P) the first bytes (e.g., most significant) of each of the set of FLOAT16*floating point numbers are to be stored. Subsequently, the second byte of (e.g., least significant) of each of the set of floating point numbers may be sent via DQ interface 214 and stored without a new address being specified via CA interface 223 because memory device 220 has been configured (and/or commanded) with both the size of the access unit (e.g., a burst size) and the number of bytes in a FLOAT16* number (2). Column sequencer 225 functions to generate the internal addressing of memory core 221 that stores the various bytes of the FLOAT16* format numbers in the appropriate access unit (e.g., P, P+1, etc.) without receiving a new address for each burst. Similar processes may be used to store FLOAT8* and FLOAT24* numbers.

Controller 212 may configure memory device 220 with an indicator of the precision (e.g., number of bytes) to be retrieved (regardless of the precision the number and/or sets of numbers.) This indicator may determine the number of access units that memory device 220 is to retrieve from memory core 221 before a new transaction address is required. In other words, memory device 220 may be configured (and/or commanded) to retrieve sets of FLOAT24* numbers that were originally stored as FLOAT32* numbers. With each byte of the individual numbers being stored in different access units, retrieving lesser precision numbers than was originally stored is accomplished by transferring fewer bursts.

For example, controller 212 can transmit a first address to memory device 220 indicating where (e.g., group P) the first bytes (e.g., most significant) of each of a set of FLOAT32*, FLOAT24*, FLOAT16*, or FLOAT8* floating point numbers are to be retrieved from. Subsequently, the second bytes (if applicable) of (e.g., next most significant) of each of the set of floating point numbers may be retrieved and sent via DQ interface 214 without a new address being specified via CA interface 223 because memory device 220 has been configured (and/or commanded) with both the size of the access unit (e.g., a burst size) and the number of bytes in the maximum precision floating point number (e.g., if a FLOAT32* is the highest precision, the maximum number of bursts would be four.) Column sequencer 225 functions to generate the internal addressing of memory core 221 that retrieves the various bytes of the configured (and/or commanded) format in the appropriate access unit (e.g., P, P+1, etc.) without receiving a new address for each burst.

For example, controller 212 can transmit a first address to memory device 220 indicating where (e.g., group P) the first bytes (e.g., most significant) of each of a set of, for example, FLOAT24*, floating point numbers that are to be retrieved. Subsequently, the second bytes (e.g., next most significant) of each of the FLOAT24* set of floating point numbers may be retrieved and sent via DQ interface 224 without a new address being specified via CA interface 223 because memory device 220 has been configured (and/or commanded) with both the size of the access unit (e.g., a burst size) and the number of bytes in the maximum precision floating point number (e.g., 3 for FLOAT24*.) Column sequencer 225 functions to generate the internal addressing of memory core 221 that retrieves the various bytes of the FLOAT24*format in the appropriate access unit (e.g., P, P+1, etc.) without receiving a new address for each burst.

Similarly, memory device 220 may be configured (and/or commanded) to retrieve sets of FLOAT16* numbers with each byte of the individual FLOAT16* numbers being retrieved from a different access unit. Thus, controller 212 can transmit a first address to memory device 220 indicating where (e.g., group P) the first bytes (e.g., most significant) of each of the set of FLOAT16* floating point numbers are stored. Subsequently, the second byte (e.g., least significant) of each of the set of floating point numbers may be retrieved and sent via DQ interface 224 and without a new address being specified via CA interface 223 because memory device 220 has been configured (and/or commanded) with both the size of the access unit (e.g., a burst size) and the number of bytes in a FLOAT16* number (2). Column sequencer 225 functions to generate the internal addressing of memory core 221 that stores the various bytes of the FLOAT16* format numbers in the appropriate access unit (e.g., P, P+1, etc.) without receiving a new address for each burst. Similar processes may be used to retrieve other size/precision numbers.

Once retrieved, floating point format processing 215 receives the data bursts comprising the portions of the sets of floating point numbers from controller 212. Floating point format processing 215 processes (e.g., reassembles) floating point numbers according to their precision. For example, floating point format processing 215 may reassemble from multiple (e.g., 4) bytes (which were previously stored in non-contiguous memory 220 locations) floating point numbers having a first precision (e.g., 32-bits) so that these numbers may be processed by processor core 211. For example, the most significant portion (e.g., byte) of these floating point numbers having the first precision may have been stored in a first range of addresses in memory 220; the second most significant portion in a second range of addresses, and so on. Thus, at least two of the portions would be arrive from memory 220 with other data intervening between the portions (e.g., other portions of other floating point numbers). Multiple non-contiguously addressed portions of floating point numbers may be assembled by floating point format processing 215 into a complete floating point numbers that are provided to processor core 211.

In an embodiment, to disassemble the multiple precision floating point numbers, floating point processing 215 may read portions of floating point registers or portions of floating point cache lines in a first order when storing floating point numbers to memory device 220. To reassemble the multiple precision floating point numbers, floating point processing 215 may write to portions of floating point registers or portions of floating point cache lines in the first order when retrieving floating point numbers to memory device 220.

Figure 3:
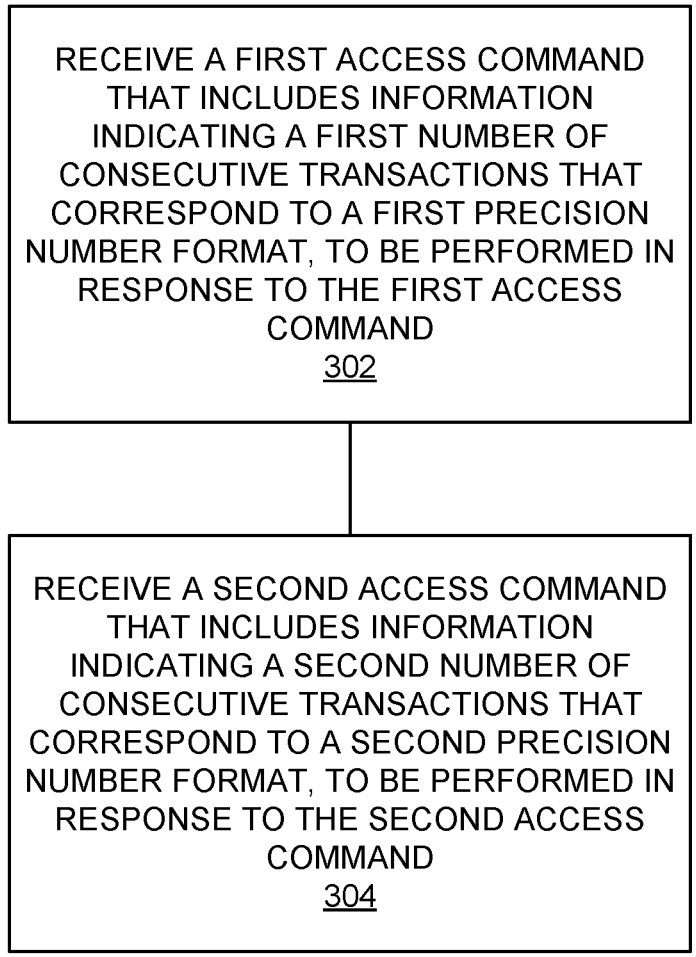
FIG. 3 is a flowchart illustrating a method of accessing floating point numbers having different precisions.

FIG. 3 is a flowchart illustrating a method of accessing floating point numbers having different precisions. The steps illustrated in FIG. 3 may be performed, for example, by one or more elements of system 200. A first access command that includes information indicating a first number of consecutive transactions that correspond to a first precision number format to be performed in response to the first access command is received (302). For example, memory device 220 may receive via CA interface 223 and access command that includes information (e.g., bits) indicating a first (e.g., 4) number of transactions that are to be performed in response to the command without a new address being specified. In another example, memory device 220 may be pre-configured (and/or commanded) by controller 212 (e.g., in a register) with a first (e.g., 4) number of transactions that are to be performed in response to a command without a new address being specified. Then, when a variable precision type access command is received, the pre-configured (and/or commanded) number of transactions are performed without a new address being specified.

A second access command that includes information indicating a second number of consecutive transactions that correspond to a second precision number format to be performed in response to the second access command is received (304). For example, memory device 220 may receive via CA interface 223 and access command that includes information (e.g., bits) indicating a second (e.g., 2) number of transactions that are to be performed in response to the command without a new address being specified. In another example, memory device 220 may be pre-configured (and/or commanded) by controller 212 (e.g., in a register) with a second number of transactions (e.g., 2) that are to be performed in response to a command without a new address being specified. Then, when a variable precision type access command is received, the second pre-configured (and/or commanded) number of transactions are performed without a new address being specified.

Figure 4:
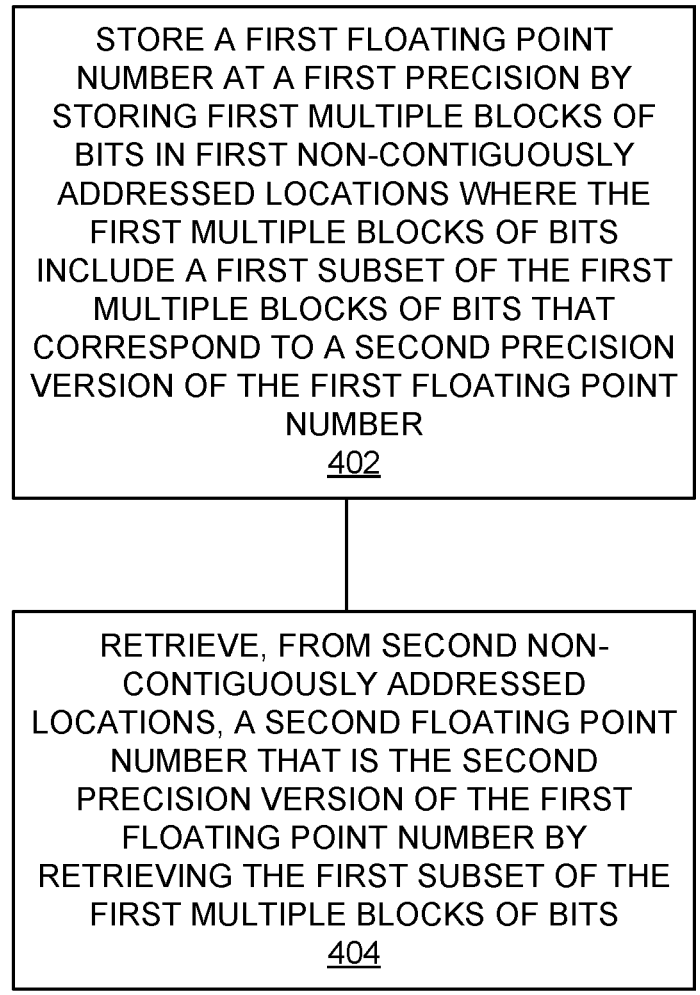
FIG. 4 is a flowchart illustrating a method of storing and retrieving, in a memory device, a floating point number at different precisions.

FIG. 4 is a flowchart illustrating a method of storing and retrieving, in a memory device, a floating point number at different precisions. The steps illustrated in FIG. 4 may be performed, for example, by one or more elements of system 200. A first floating point number is stored at a first precision by storing first multiple blocks of bits in first non-contiguously addressed locations where the first multiple blocks of bits include a first subset of the first multiple blocks of bits that correspond to a second precision version of the first floating point number (402). For example, after a burst is formatted by floating-point format processing 215, controller 212 may store a first floating point number (as part of a set) in, for example, the FLOAT32* format. As discussed herein with reference to FIGS. 1A-1D, the FLOAT32* format includes various subsets of bits that respectively correspond to the FLOAT24*, FLOAT16* and FLOATS* formats.

From second non-contiguously addressed locations, a second floating point number is retrieved that is the second precision version of the first floating point number by retrieving the first subset of the first multiple blocks of bits (404). For example, controller 212 may retrieve a second floating point number (as part of a set) that is in, for example, the FLOAT24* format from a subset of the non-contiguously addressed locations where the FLOAT32* format number was stored.

Figure 5:
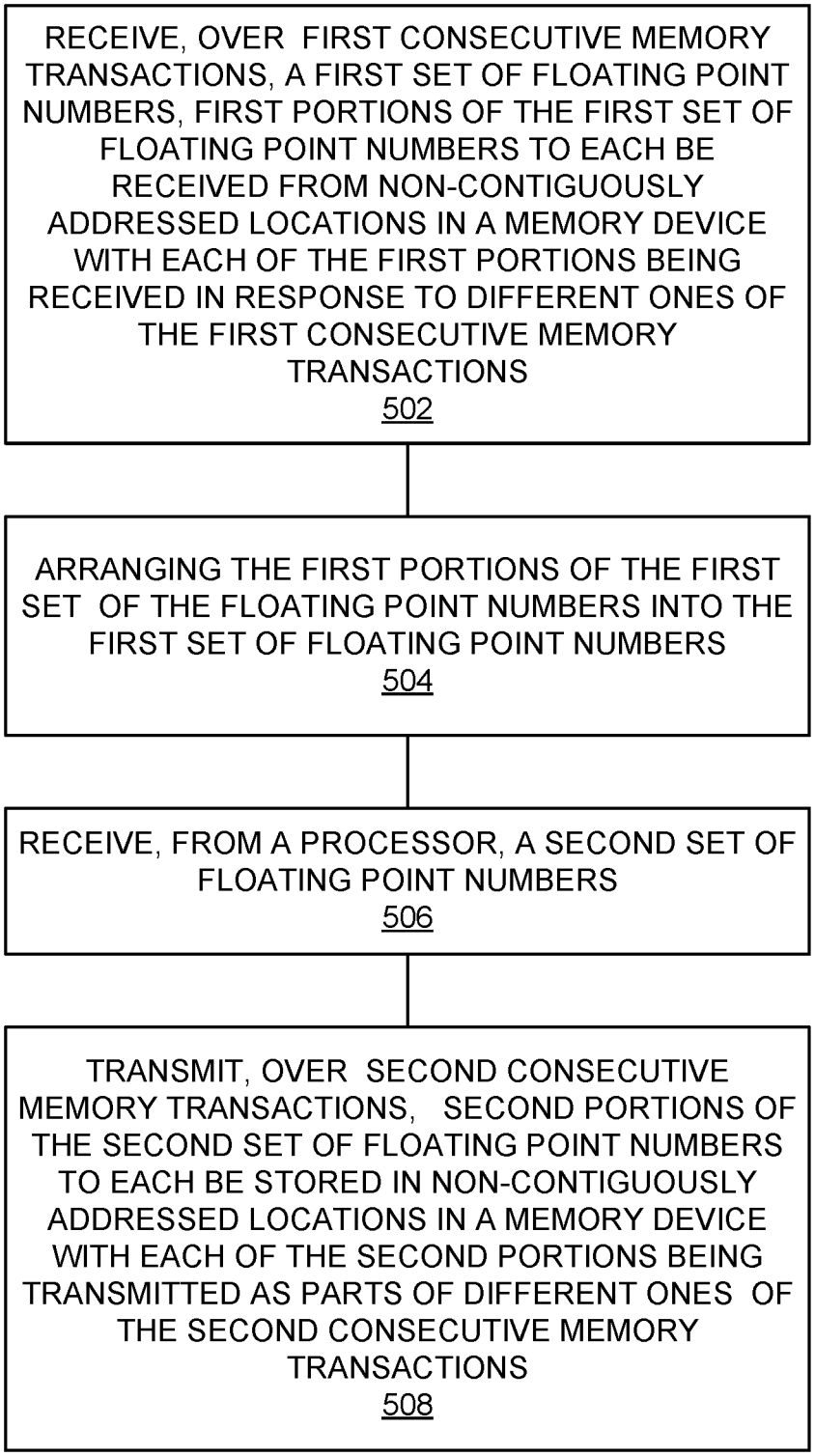
FIG. 5 is a flowchart illustrating a method of retrieving and storing floating point numbers from/to a memory device.

FIG. 5 is a flowchart illustrating a method of retrieving and storing floating point numbers from/to a memory device. The steps illustrated in FIG. 5 may be performed, for example, by one or more elements of system 200. Over first consecutive memory transactions, a first set of floating point numbers is received, where first portions of the first set of floating point numbers are each received from non-contiguously addressed locations in a memory device with each of the first portions being received in response to different ones of the first consecutive memory transactions (502). For example, processor 210 (and FP format processor 215, in particular) may receive a set of floating point numbers that are spread out over a plurality of data bursts received from memory device 220. These data bursts may be received from memory device 220 in response to a single command sent via CA interface 213 with the addresses of the subsequent data bursts being calculated by column sequencer 225 in memory device 220.

The first portions of the first set of the floating point numbers are arranged into the first set of floating point numbers (504). For example, floating-point format processing 215 may receive the data bursts sent by memory device 220 in response to a 'multi-precision' memory access command. Floating-point format processor 215 may arrange the portions of the floating point numbers into complete floating-point numbers.

From a processor, a second set of floating point numbers is received (506). For example, floating-point format processing 215 may receive, from processor core 211, a set of floating point numbers. The number of floating point numbers in this set may correspond to an access unit and/or data burst size.

Over second consecutive memory transactions, second portions of the second set of floating point numbers are transmitted in order to be stored in non-contiguously addressed locations in a memory device with each of the second portions being transmitted as parts of different ones of the second consecutive memory transactions (508). For example, controller 212 may transmit separate portions of the floating point numbers in the set received from processor core 211 using separate transactions with memory device 220. In other words, for example, a set of multiple floating point numbers may be assembled so that a first transaction (e.g., burst) stores all of the respective most significant bytes of the set of floating point numbers in a single transaction to a first range of addresses. A second transaction may then store the respective second most significant bytes to a second (different) range of addresses, and so on.

FIGS. 6A-6F are a diagrams illustrating the use of column offsets to efficiently access floating point numbers having different precisions. Column offsets (a.k.a., granular memory column access) are described in U.S. Pat. No. 6,825,841 to Hampel et al. and titled "GRANULARITY MEMORY COLUMN ACCESS" (hereinafter Hampel) the entirety of which is hereby incorporated herein by reference for all purposes.

One aspect described in Hampel is a memory device (e.g., memory device 220) that accesses different memory arrays concurrently where different columns may be addressed for each memory array. Thus, for example, for a 32-bit access, a first byte of the 32-bits may be stored/retrieved in/from a first array, a second byte a second array, a third byte a third array, and the fourth byte stored/retrieved in/from a fourth array. However, each of these first, second, third, and fourth bytes may be stored at different column addresses. This aspect may be used to efficiently store/retrieve portions of floating point numbers having different precisions.

Figure 6A:
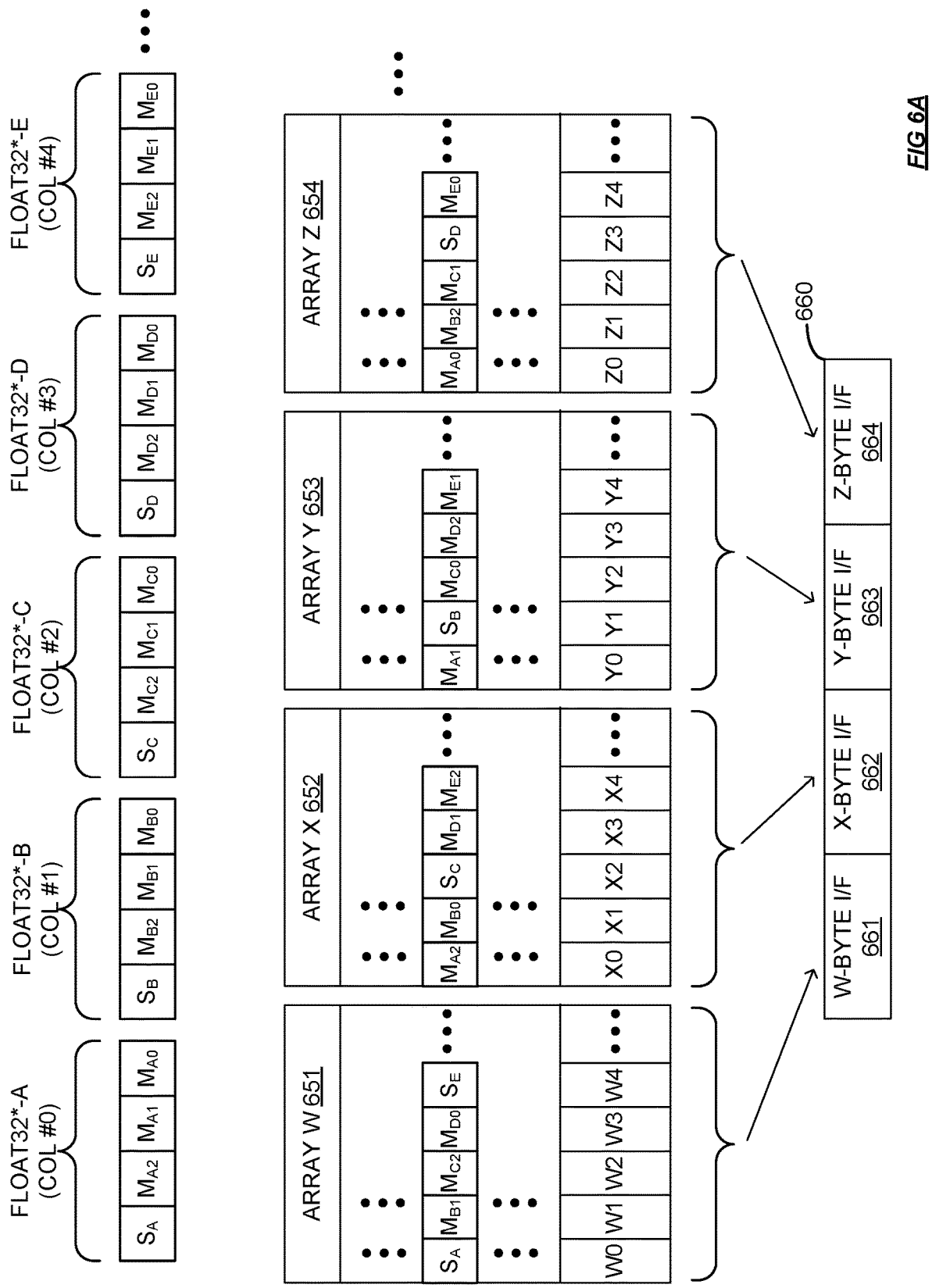
FIGS. 6A-6F are diagrams illustrating the use of column offsets to efficiently access floating point numbers having different precisions.

FIG. 6A illustrates an arrangement of the portions of an example floating point format in a memory device that can access multiple arrays using different column addresses (e.g., as described in Hampel.) In FIGS. 6A-6D, five 32-bit floating point numbers A, B, C, D, and E are illustrated. These are labeled in FIGS. 6A-6D as FLOAT32*-A, FLOAT32*-B, FLOAT32*-C, FLOAT32*-D, FLOAT32*-E. The portions (e.g., bytes) of each of these numbers are denoted as follows: $S_X$ is the sign and exponent byte (e.g., most significant byte), $M_{X2}$ is the most significant byte of the mantissa, $M_{X1}$, the third most significant byte of the mantissa, and $M_{X0}$ is the least significant byte of the mantissa, where X is the floating point label (e.g., SB is the sign and exponent byte in the illustration of floating point number "B".)

Floating point numbers A, B, C, D, and E are stored, for example, in a single row of four memory arrays W 651, X 652, Y 653, and Z 654. Byte-wide groups of column sense amplifiers (or other memory element associated with the reading/writing of a row into a memory array 651-654) are labeled with the array label (W, X, Y, or Z—as appropriate) and a number denoting a column address for the byte wide group (e.g., X0 is the label for the column group of the first byte addressed in a row off array X 652, X1 is the label for the column group of the second byte addressed in a row off array X 652, and so on.)

Each array 651-654 provides (or receives) a byte to (or comes from) the same 8 bits of interface 660 each transaction. Thus, the bytes of interface 660 are labeled W-BYTE I/F 661, X-BYTE I/F 662, Y-BYTE I/F 663, Z-BYTE I/F 664 in FIGS. 6A-6D.

In FIGS. 6A-6D, the portions (e.g., bytes) of floating point number A are stored as follows: SA is stored in byte group W0, $M_{A2}$ in X0, $M_{A1}$ in Y0, and MA0 in Z0. Floating point number B is stored as follows: SB is stored in byte group Y1, $M_{B2}$ in Z1, $M_{B2}$ in W1, and $M_{B0}$ in X1. Floating point number C is stored as follows: Sc is stored in byte group X2, $M_{C2}$ in W2, $M_{C1}$ in Z2, and $M_{C0}$ in Y2. Floating point number D is stored as follows: SD is stored in byte group Z3, $M_{D2}$ in Y3, Mm in X3, and $M_{D0}$ in W3. The pattern then repeats, and floating point number E is stored using the same portion to column group assignment as floating point number A: SE is stored in byte group W0, $M_{E2}$ in X0, $M_{E1}$ in Y0, and $M_{E0}$ in Z0. This pattern continues for additional floating point numbers (e.g., F, G, H, etc.—not shown in FIGS. 6A-6D for the sake of brevity.)

Figure 6B:
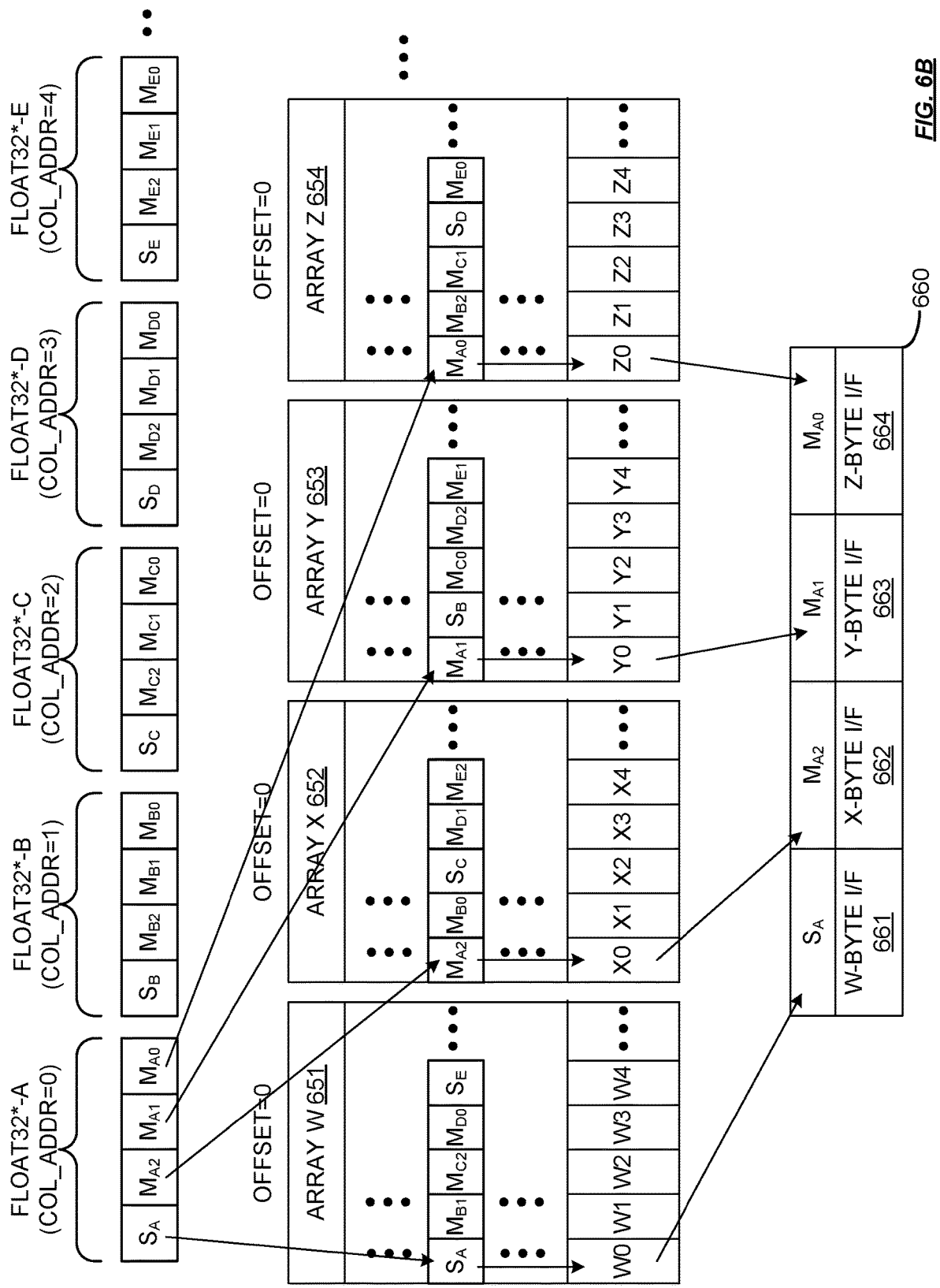

FIG. 6B illustrates the storage and accessing of a first FLOAT32* format number. This first number (FLOAT32*-A) is stored at the column group address of zero (0). Thus, to access (read or write) FLOAT32*-A, W0, X0, Y0, and Z0 column groups are accessed. Accordingly, in FIG. 6B, SA is stored in the W0 column group of array W 651; $M_{A2}$ is stored in is stored in the X0 column group of array X 652; $M_{A1}$ is stored in the Y0 column group of array Y 653; and, Mao is stored in the Z0 column group of array Z 654. When the first FLOAT32* format number is read, array W 651, via column group W0, provides the retrieved SA value to the W-byte interface 661; array X 652, via column group X0, provides the retrieved $M_{A2}$ value to the X-byte interface 662; array Y 653, via column group Y0, provides the retrieved $M_{A1}$ value to the Y-byte interface 663; and, array Z 654, via column group Z0, provides the retrieved $M_{A0}$ value to the Z-byte interface 664.

Figure 6C:
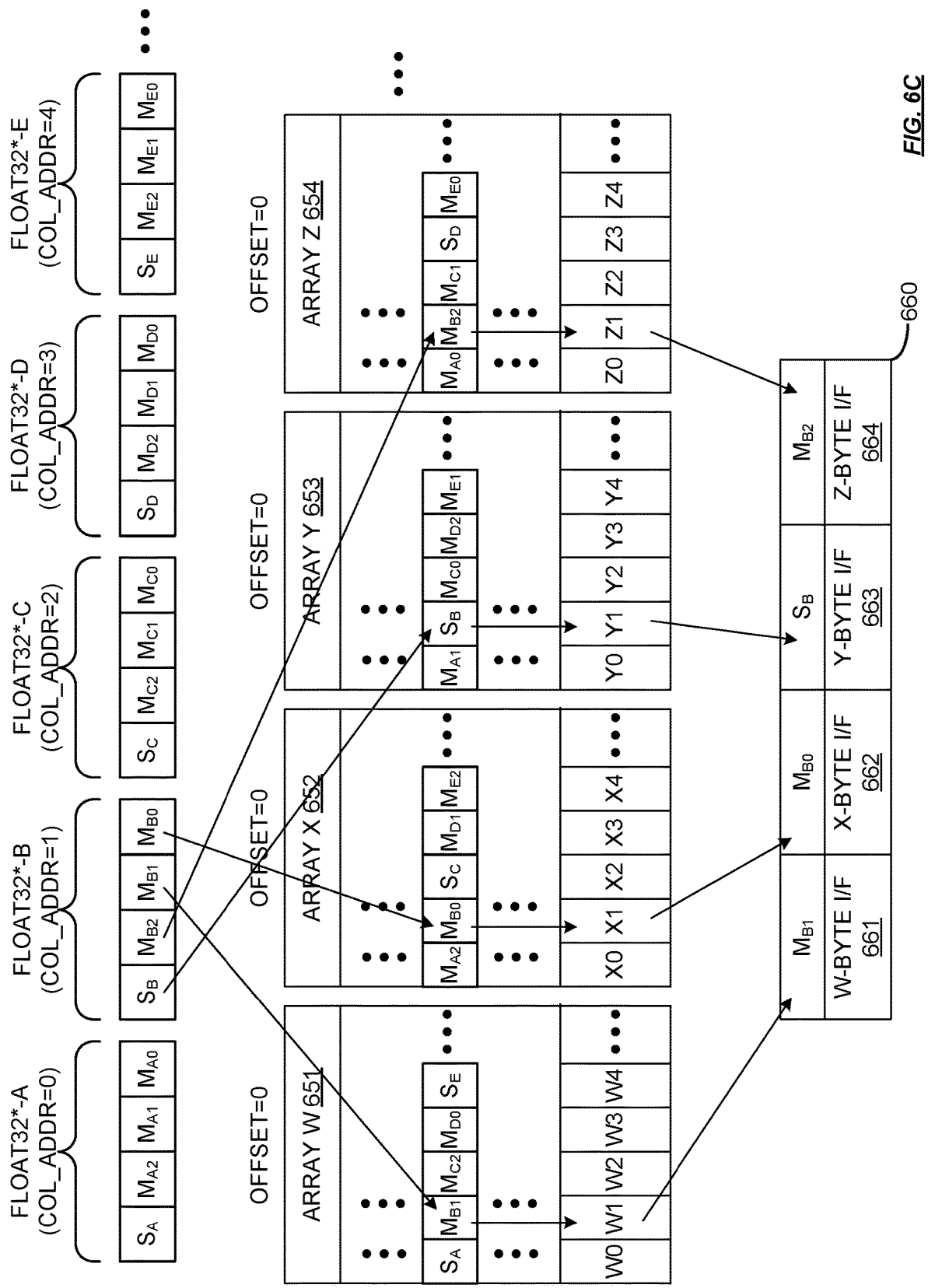

FIG. 6C illustrates the storage and accessing of a second FLOAT32* format number. This second number (FLOAT32*-B) is stored at the column group address of one (1). Thus, to access (read or write) FLOAT32*-B, W1, X1, Y1, and Z1 column groups are accessed. Accordingly, in FIG. 6C, SB is stored in the Y1 column group of array Y 653; $M_{B2}$ is stored in is stored in the Z1 column group of array Z 654; $M_{B1}$ is stored in the W1 column group of array W 651; and, MBO is stored in the X1 column group of array X 652. When the second FLOAT32* format number is read, array W 651, via column group W1, provides the retrieved $M_{B1}$ value to the W-byte interface 661; array X 652, via column group X1, provides the retrieved $M_{B0}$ value to the X-byte interface 662; array Y 653, via column group Y1, provides the retrieved SB value to the Y-byte interface 663; and, array Z 654, via column group Z1, provides the retrieved $M_{B2}$ value to the Z-byte interface 664. Thus, it should be understood that the bytes of the 32-bit value received via interface 660 will need to be re-arranged (e.g., by FP format processing 115) before being used by a processor.

Figure 6D:
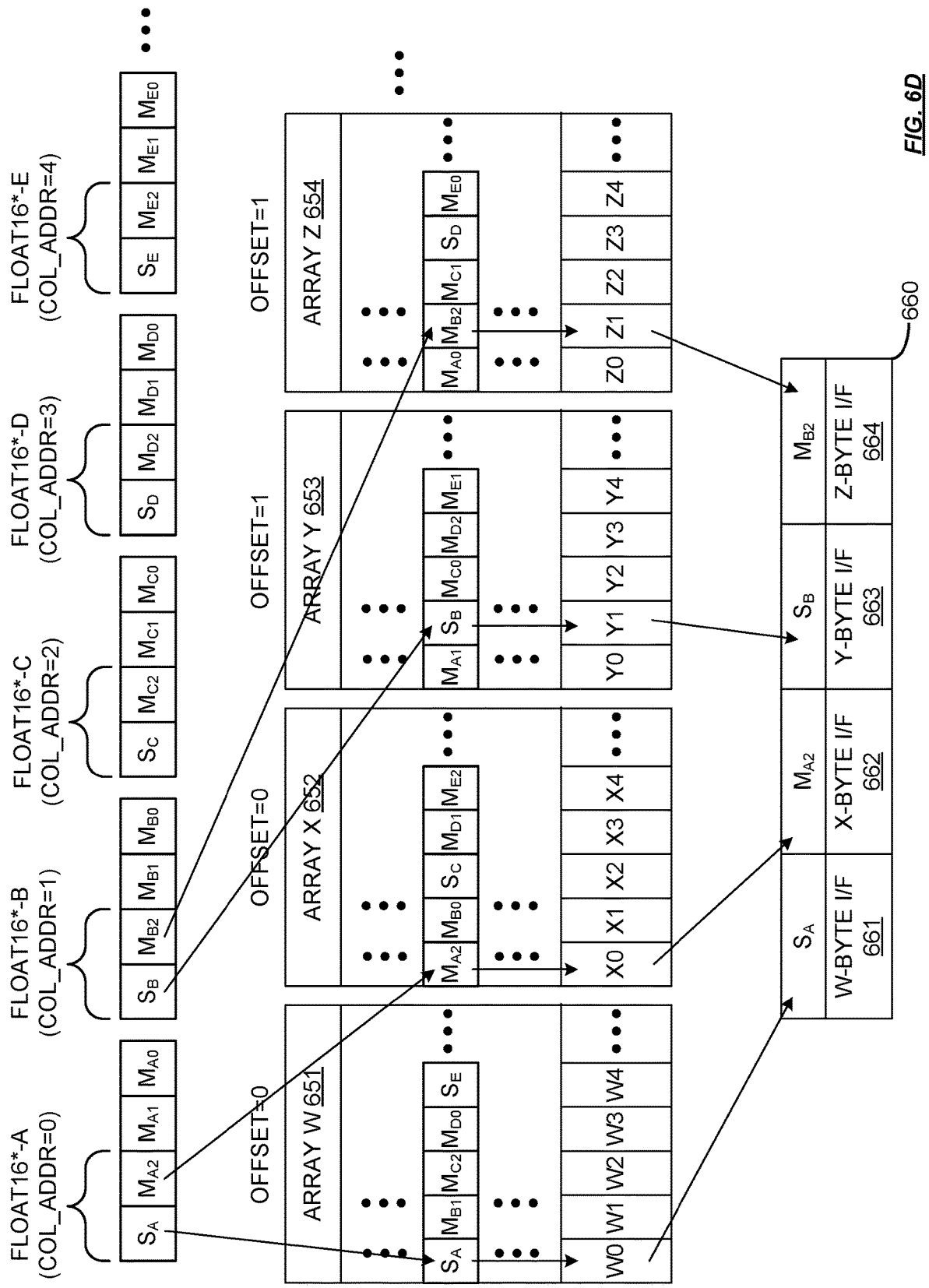

FIG. 6D illustrates the storage and accessing of a first two FLOAT16* format numbers using column offsets. A first one of the two FLOAT16* numbers (FLOAT16*-A) is stored at the column group address of zero (0). A second one of the two FLOAT16* numbers (FLOAT16*-B) is stored at the column group address of one (1). Thus, to access (read or write) the first number (FLOAT16*-A) the W0 and X0 column groups are accessed. To access the second number (FLOAT16*-B), the Y1 and Z1 column groups are accessed. Accordingly, when these two FLOAT16* format numbers are accessed, arrays W 651 and X 652 are configured (and/or commanded) with a column offsets of zero (0). Arrays Y 653 and Z 654 are configured (and/or commanded) with column offsets of one (1). The results are that, when accessed, array W 651, via column group W0, provides the retrieved SA value to the W-byte interface 661; array X 652, via column group X0, provides the retrieved $M_{A2}$ value to the X-byte interface 662; array Y 653, via column group Y1, provides the retrieved SB value to the Y-byte interface 663; and, array Z 654, via column group Z1, provides the retrieved $M_{B2}$ value to the Z-byte interface 664. Thus, by selecting an offset of one for the Y 653 and Z 654 arrays, two different FLOAT16* numbers (e.g., FLOAT16*-A and FLOAT16*-B) can be accessed using the same address/transaction.

Figure 6E:
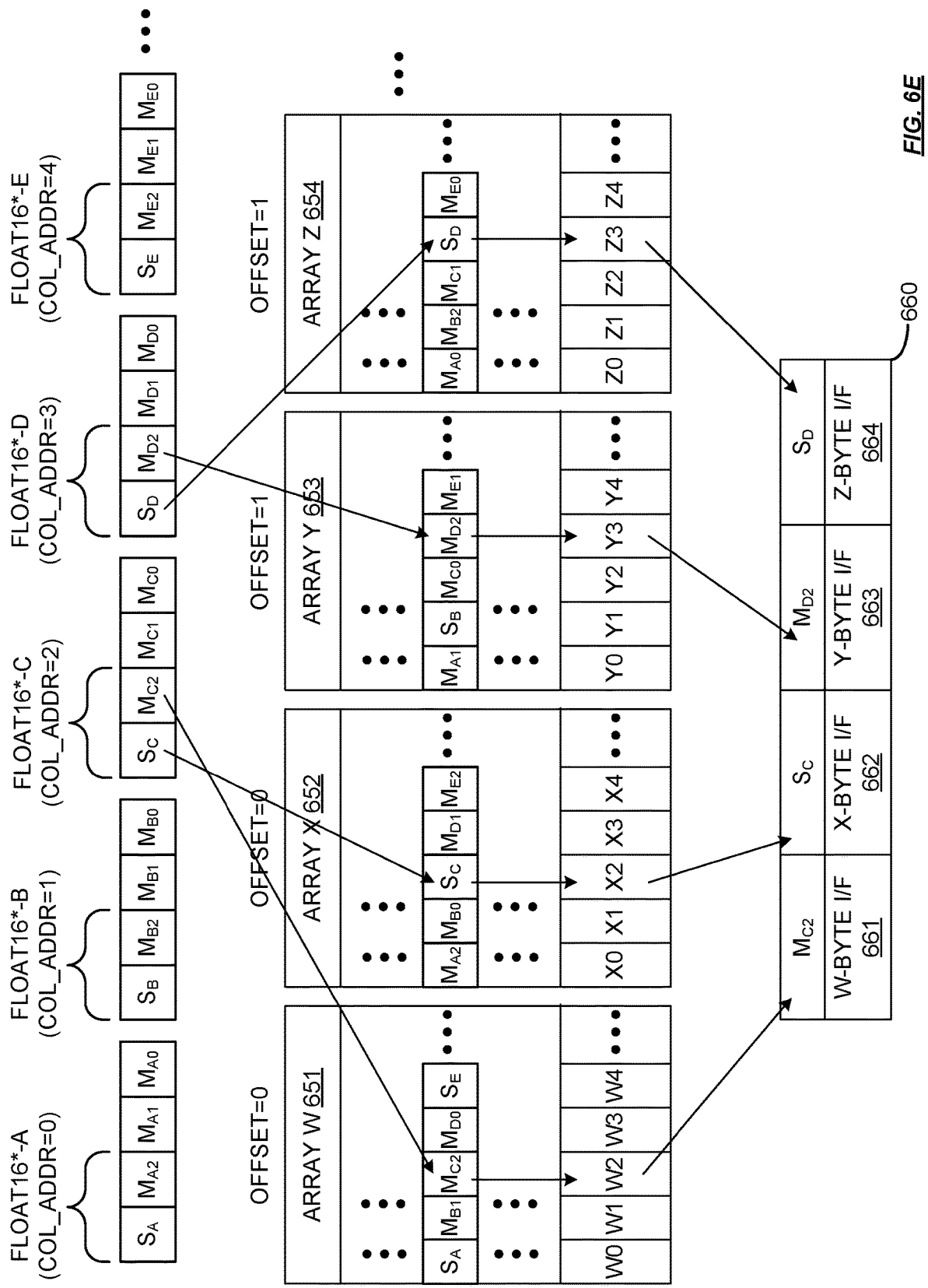

FIG. 6E illustrates the storage and accessing of a second two FLOAT16* format numbers using column offsets. A first one of the second two FLOAT16* numbers (FLOAT16*-C) is stored at the column group address of two (2). A second one of the second two FLOAT16* numbers (FLOAT16*-D) is stored at the column group address of three (3). Thus, to access (read or write) the first number (FLOAT16*-C) the W2 and X2 column groups are accessed. To access the second number (FLOAT16*-D), the Y3 and Z3 column groups are accessed. Accordingly, when the second two FLOAT16* format number are read, arrays W 651 and X 652 are configured (and/or commanded) with a column offsets of zero (0) and the column address provided to the memory device is set to two (2) (i.e., COL_ADDR=2—the address of FLOAT16*-C) Arrays Y 653 and Z 654 are configured (and/or commanded) with column offsets of one (1). Thus, when accessed, array W 651, via column group W2, provides the retrieved Mcg value to the W-byte interface 661; array X 652, via column group X2, provides the retrieved Sc value to the X-byte interface 662; array Y 653, via column group Y3, provides the retrieved $M_{D2}$ value to the Y-byte interface 663; and, array Z 654, via column group Z3, provides the retrieved SD value to the Z-byte interface 664. Thus, by selecting an offset of one for the X and Y 653 and Z 654 arrays, two different FLOAT16* numbers (e.g., FLOAT16*-C and FLOAT16*-D) can be accessed using the same address/transaction. However, it should be understood that the bytes of the two 16-bit values received via interface 660 will need to be re-arranged (e.g., by FP format processing 215) before being used by a processor.

Figure 6F:
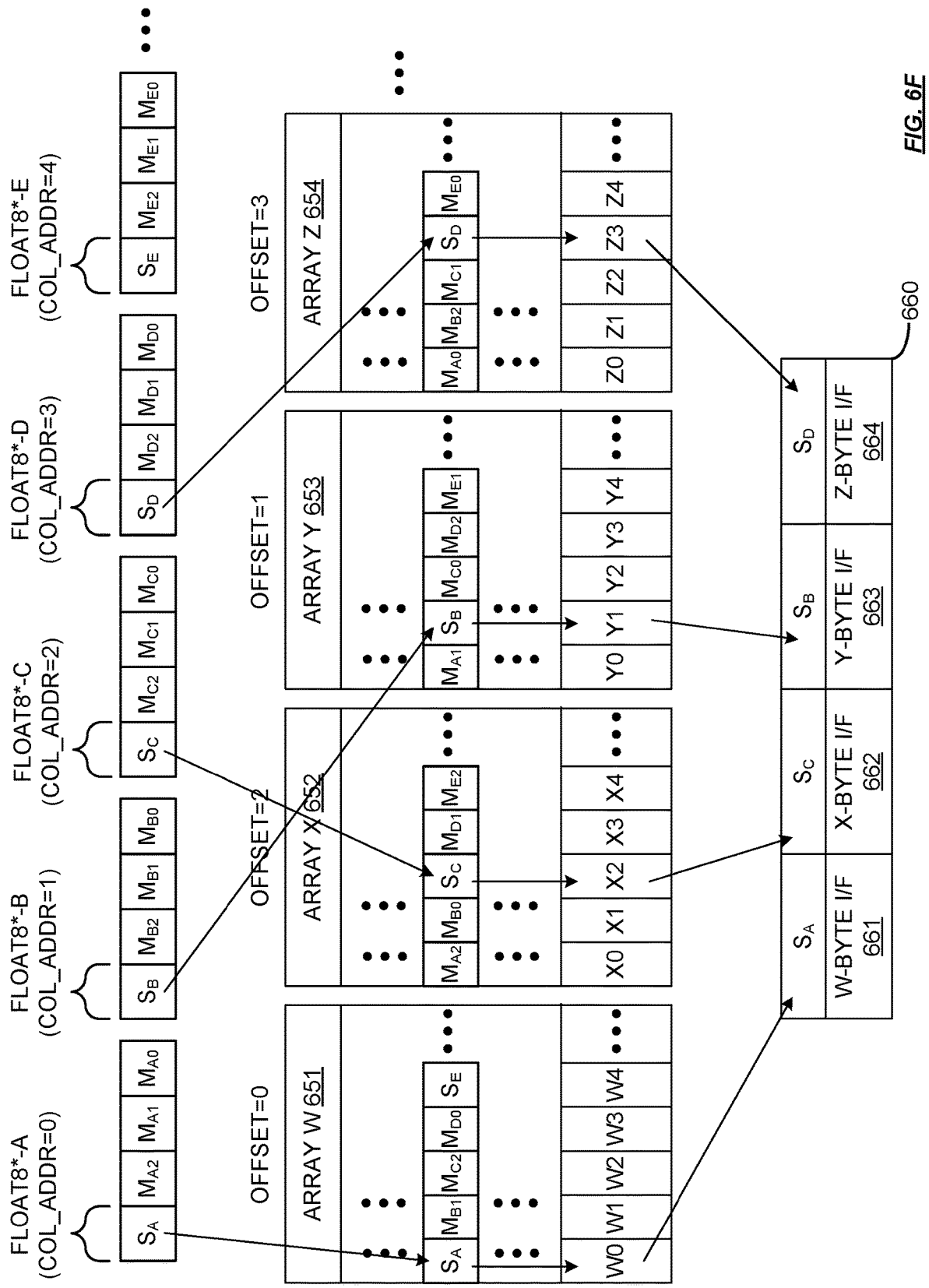

FIG. 6F illustrates the storage and accessing of four FLOAT8* format numbers using column offsets. A first one of the four FLOAT8* numbers (FLOAT8*-A) is stored at the column group address of zero (0). A second one of the four FLOAT8* numbers (FLOAT8*-B) is stored at the column group address of one (1). A third one of the four FLOAT8* numbers (FLOAT8*-C) is stored at the column group address of two (2). A fourth one of the four FLOAT8* numbers (FLOAT8*-D) is stored at the column group address of three (3). Thus, to access (read or write) the first number (FLOAT8*-A) the W0 column groups is accessed. To access the second number (FLOAT16*-B), the Y1 column group is accessed. To access the third number (FLOAT8*-C), the X2 column group is accessed. To access the fourth number (FLOAT8*-D), the Z3 column group is accessed. Accordingly, when the four FLOAT8* format numbers are accessed, array W 651 is configured (and/or commanded) with a column offset of zero (0); array X 652 is configured (and/or commanded) with a column offset of two (2). Array Y 653 is configured (and/or commanded) with column offsets of one (1); and, array Z 654 is configured (and/or commanded) with a column offset of three (3). Thus, when accessed, array W 651, via column group W0, provides the retrieved SA value to the W-byte interface 661; array X 652, via column group X2, provides the retrieved Sc value to the X-byte interface 662; array Y 653, via column group Y1, provides the retrieved SB value to the Y-byte interface 663; and, array Z 654, via column group Z3, provides the retrieved SD value to the Z-byte interface 664. Thus, by selecting appropriate offsets of the W, 651, X 652, Y 653, and Z 654 arrays, four different FLOAT8* numbers can be accessed using the same address/transaction.

Table 1 illustrates an example byte arrangements for 8 consecutive FLOAT32* accesses.

TABLE 1

| Column Address Strobe (CAS) | Column address | W array offset | X array offset | Y array offset | Z array offset | W I/F value | X I/F value | Y I/F value | Z I/F value |
|---|---|---|---|---|---|---|---|---|---|
| 0 | 0 | 0 | 0 | 0 | 0 | $S_A$ | $M_{A2}$ | $M_{A1}$ | $M_{A0}$ |
| 1 | 1 | 0 | 0 | 0 | 0 | $M_{B1}$ | $M_{B0}$ | $S_B$ | $M_{B2}$ |
| 2 | 2 | 0 | 0 | 0 | 0 | $M_{C2}$ | $S_C$ | $M_{C0}$ | $M_{C1}$ |
| 3 | 3 | 0 | 0 | 0 | 0 | $M_{D0}$ | $M_{D1}$ | $M_{D2}$ | $S_D$ |
| 4 | 4 | 0 | 0 | 0 | 0 | $S_E$ | $M_{E2}$ | $M_{E1}$ | $M_{E0}$ |
| 5 | 5 | 0 | 0 | 0 | 0 | $M_{F1}$ | $M_{F0}$ | $S_F$ | $M_{F2}$ |
| 6 | 6 | 0 | 0 | 0 | 0 | $M_{G2}$ | $S_G$ | $M_{G0}$ | $M_{G1}$ |
| 7 | 7 | 0 | 0 | 0 | 0 | $M_{H0}$ | $M_{H1}$ | $M_{H2}$ | $S_H$ |

Table 2 illustrates an example byte arrangements for 4 consecutive FLOAT16* accesses.

TABLE 2

| Column Address Strobe (CAS) | Column address | W array offset | X array offset | Y array offset | Z array offset | W I/F value | X I/F value | Y I/F value | Z I/F value |
|---|---|---|---|---|---|---|---|---|---|
| 0 | 0 | 0 | 0 | 1 | 1 | $S_A$ | $M_{A2}$ | $S_B$ | $M_{B2}$ |
| 1 | 2 | 0 | 0 | 1 | 1 | $M_{C2}$ | $S_C$ | $M_{D2}$ | $S_D$ |
| 2 | 4 | 0 | 0 | 1 | 1 | $S_E$ | $M_{E2}$ | $S_F$ | $M_{F2}$ |
| 3 | 6 | 0 | 0 | 1 | 1 | $M_{G2}$ | $S_G$ | $M_{G2}$ | $S_G$ |

Table 3 illustrates an example byte arrangements for 2 consecutive FLOAT8* accesses.

TABLE 3

| Column Address Strobe (CAS) | Column address | W array offset | X array offset | Y array offset | Z array offset | W I/F value | X I/F value | Y I/F value | Z I/F value |
|---|---|---|---|---|---|---|---|---|---|
| 0 | 0 | 0 | 2 | 1 | 3 | $S_A$ | $S_C$ | $S_B$ | $S_D$ |
| 1 | 4 | 0 | 2 | 1 | 3 | $S_E$ | $S_G$ | $S_F$ | $S_H$ |

FIGS. 7A-7E illustrate configurations of a memory device. In FIGS. 7A-7E, memory device 700 comprises row decoder 765, memory arrays W 751, X 752, Y 753, and Z 754, precision configuration circuitry 727, column logic 728, W array column access block 755, X array column access block 756, Y array column access block 757, Z array column access block, W array byte 761, X array byte 762, Y array byte 763, Z array byte 764, swizzle circuitry 777, byte zero (0) interface 770, byte one (1) interface 761, byte two (2) interface 772, and byte three (3) interface 773. Column logic 728 may include column sequence logic 729. Column access blocks 755-758 may include column decoder logic/circuitry. Column access blocks 755-758 may include data path logic/circuitry to access/select/write/etc. the columns of the respective memory arrays 751-754.

A row address (ROW_ADDR) is provided to row decoder 765. Row decoder selects a row in each of memory arrays 751-754. The contents of the selected rows in memory arrays 751-754 are provided to column decoders 755-758, respectively.

Precision configuration 727 is operatively coupled to column logic 728. Precision configuration may configure column logic 728 with offsets that affect the selections by column decoders 755-758 as described in Hampel, referenced herein. Precision configuration 727 may also provide column logic with precision information that configures (and/or commands) column logic 727 to receive a first transaction and then generate internal accesses for the subsequent bytes without receiving additional transactions. See, for example, the discussion of system 200 which will not be repeated here for the sake of brevity.

A column address (COL_ADDR) is provided to column logic 728. Column logic provides column addresses to column decoders 755-758. These column address may be the same, or may include one or more offsets. For a read of memory arrays 751-754, the outputs from column decoders 755-758 are bytes 761-764. Bytes 761-764 are provided to swizzle circuitry 777. The outputs of swizzle circuitry 777 are provided to byte interfaces 770-773. For a write of memory arrays 751-754, the values received via byte interfaces 770-773 are provided to swizzle circuitry 777. The outputs of swizzle circuitry 777 are provided to column decoders 755-758. It should be understood that the use of four (4) 8-bit bytes as the access and interface 760 width of memory device 700 is merely an example. Other numbers of bits (e.g., 4, 16, etc.) per interface group and array access width may be selected and may not match each other.

Figure 7A:
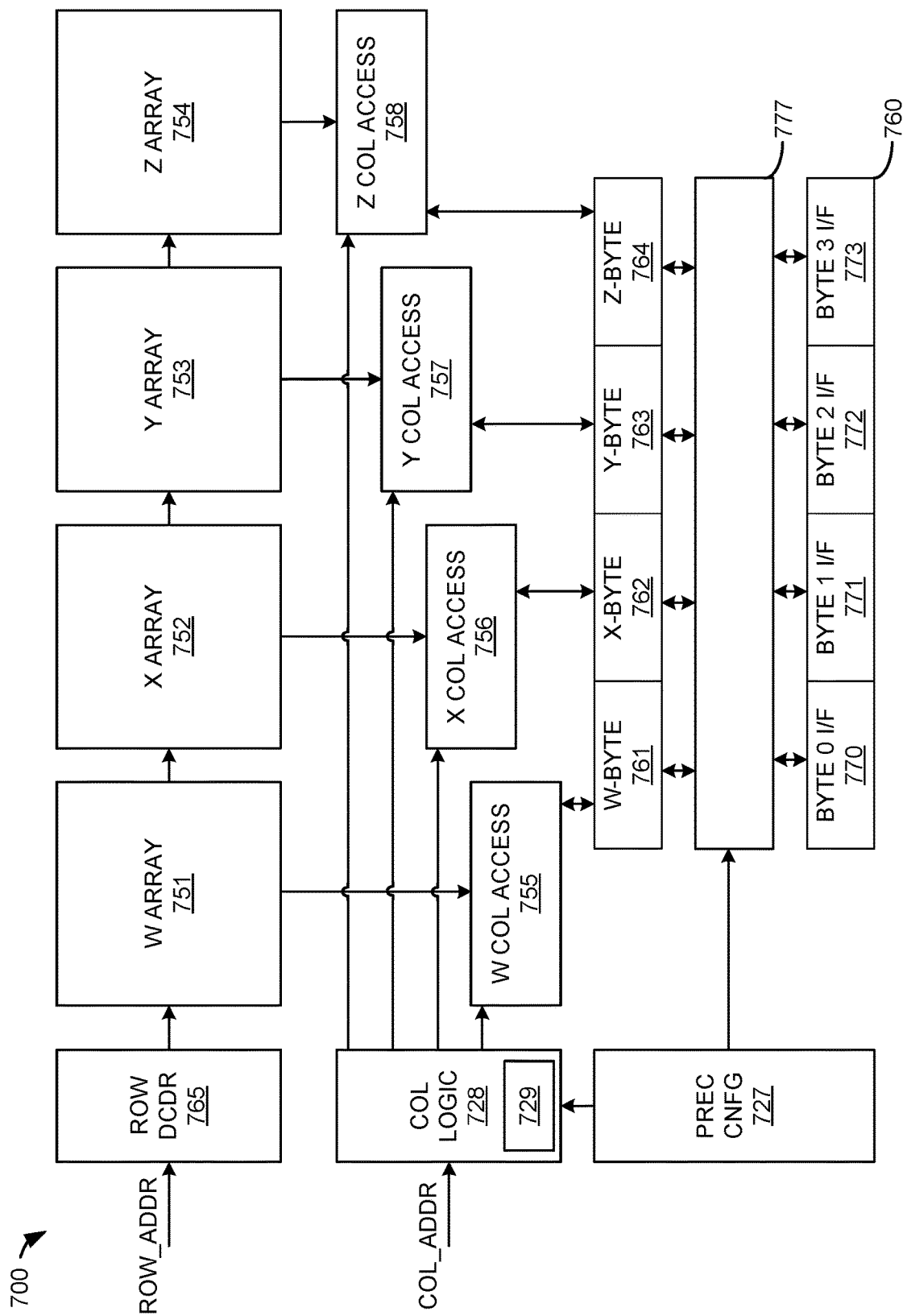
FIGS. 7A-7E illustrate configurations of a memory device.
Figure 7B:
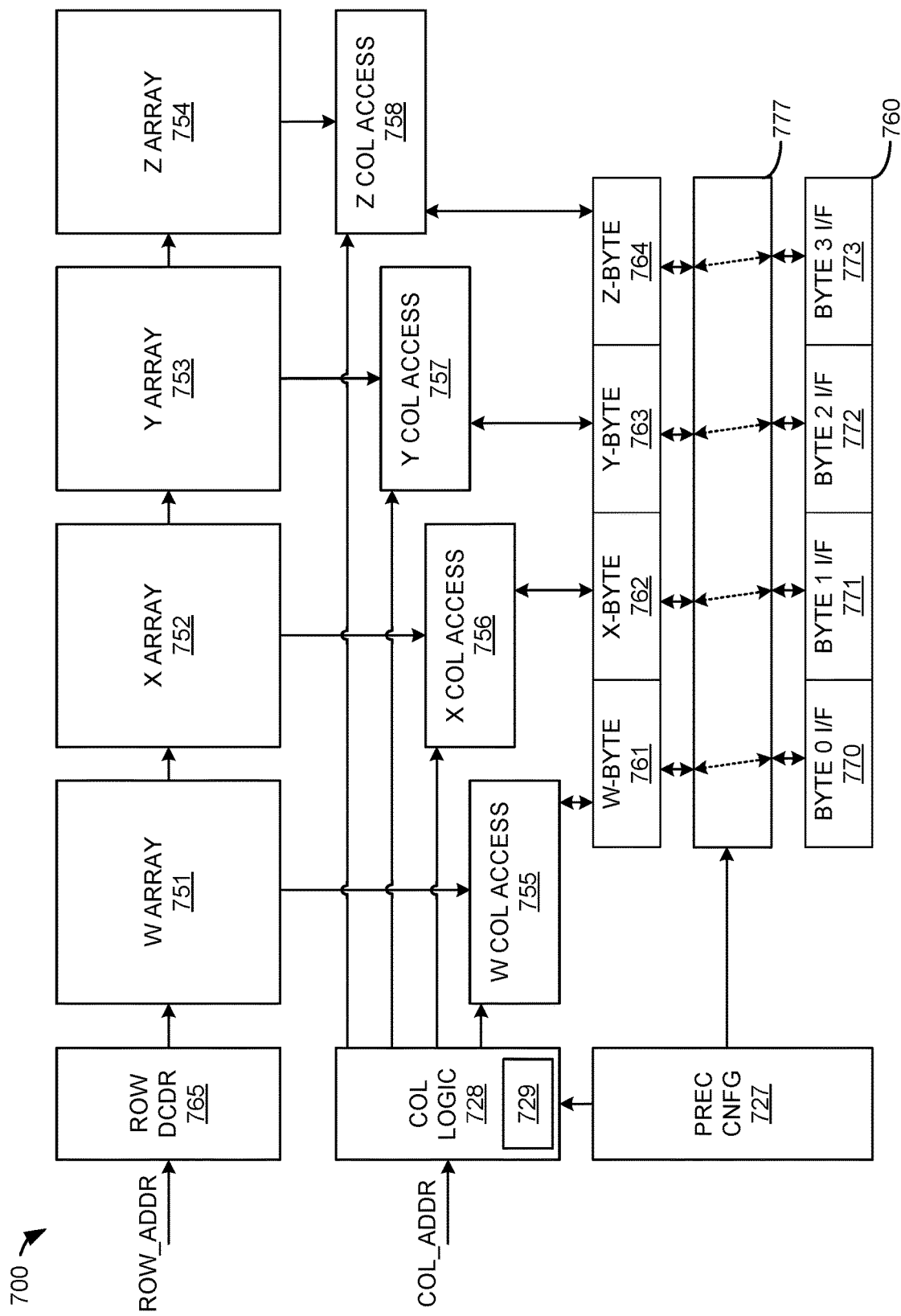

As described with reference to FIG. 6B and FIG. 6D, some FLOAT32* and FLOAT16* accesses do not need to be rearranged. This is illustrated in FIG. 7B where swizzle circuitry 777 is configured (and/or commanded) to not rearrange the bytes received/sent from/to column decoders 755-758. Thus, precision configuration circuitry 727 configures (and/or commands) swizzle circuitry 777 as follows: byte 0 interface 770 receives/transmits the byte to/from W column decoder 755; byte 1 interface 771 receives/transmits the byte to/from X column decoder 756; byte 2 interface 772 receives/transmits the byte to/from Y column decoder 757; byte 3 interface 773 receives/transmits the byte to/from Z column decoder 758.

Figure 7C:
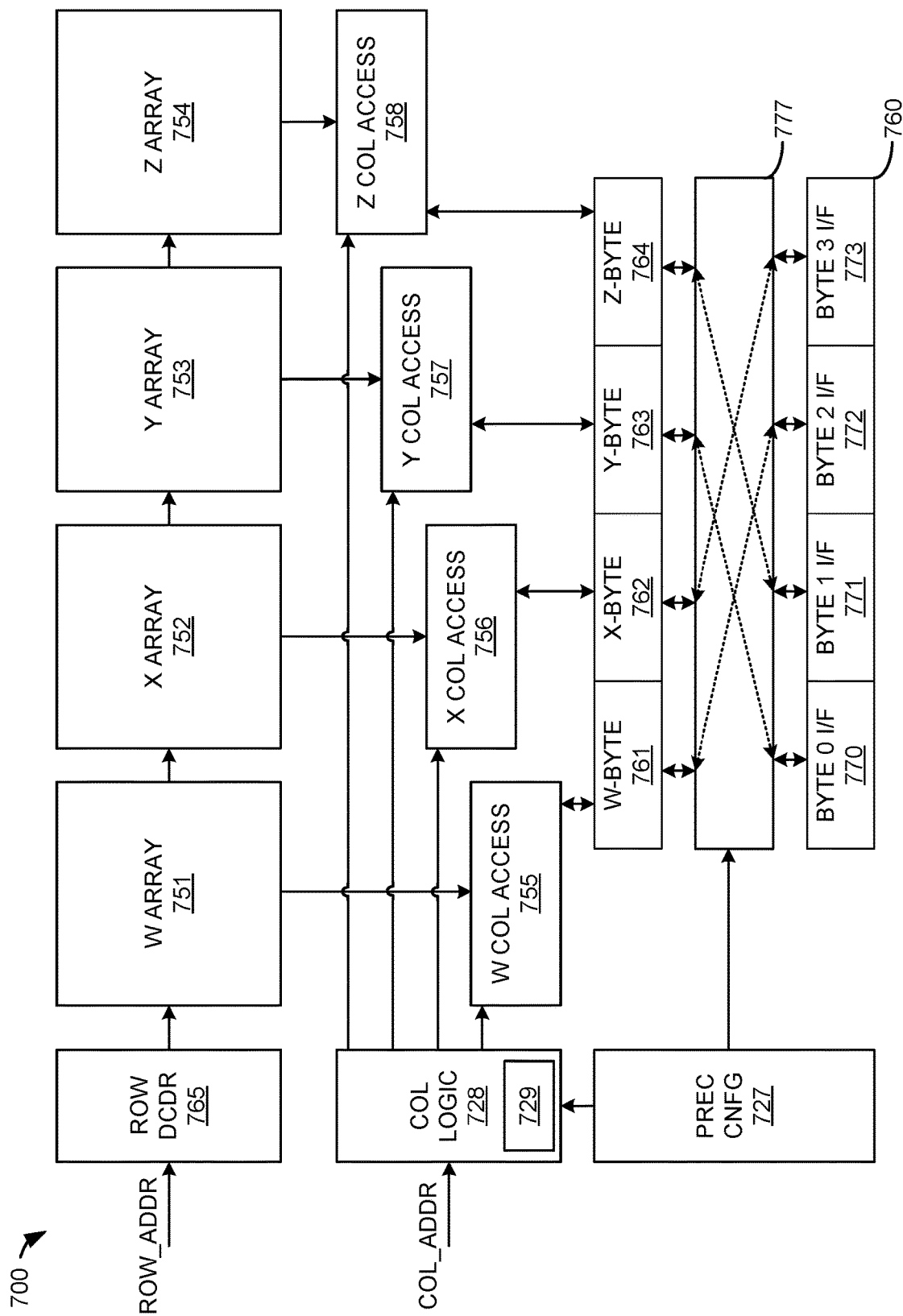

As described with reference to FIG. 6C, some FLOAT32* accesses need to be rearranged. This is illustrated in FIG. 7C where swizzle circuitry 777 is configured (and/or commanded) to rearrange the bytes received from column decoders 755-758. Thus, precision configuration circuitry 727 configures (and/or commands) swizzle circuitry 777 as follows: byte 0 interface 770 receives/transmits the byte to/from Y column decoder 757; byte 1 interface 771 receives/transmits the byte to/from Z column decoder 758; byte 2 interface 772 receives/transmits the byte to/from W column decoder 755; byte 3 interface 773 receives/transmits the byte to/from X column decoder 756.

Figure 7D:
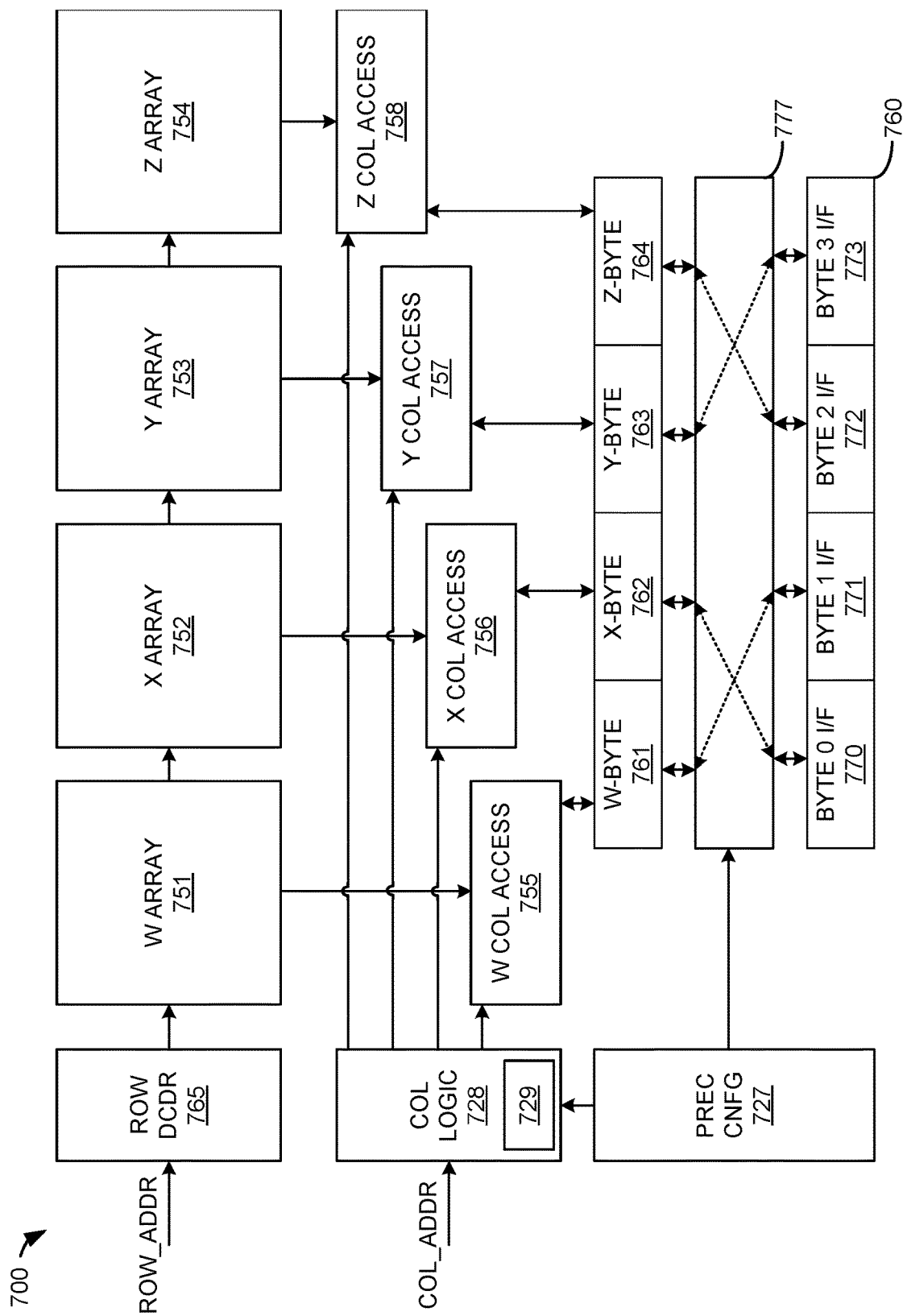
Figure 7E:
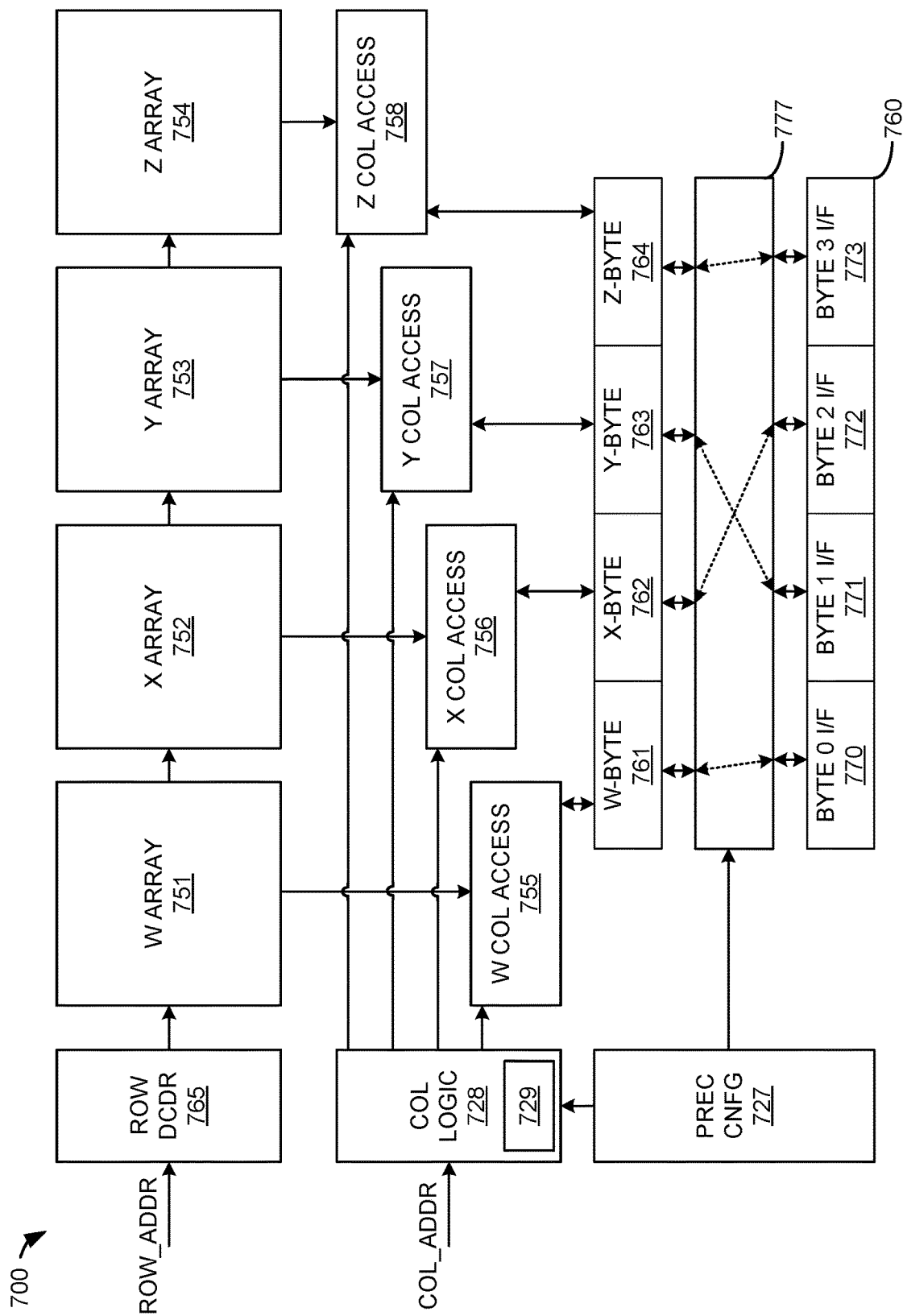

As described with reference to FIG. 6E, some FLOAT16* accesses need to be rearranged. This is illustrated in FIG. 7D where swizzle circuitry 777 is configured (and/or commanded) to rearrange the bytes received from column decoders 755-758. Thus, precision configuration circuitry 727 configures (and/or commands) swizzle circuitry 777 as follows: byte 0 interface 770 receives/transmits the byte to/from X column decoder 756; byte 1 interface 771 receives/transmits the byte to/from W column decoder 755; byte 2 interface 772 receives/transmits the byte to/from Z column decoder 758; byte 3 interface 773 receives/transmits the byte to/from Y column decoder 757.

As described with reference to FIG. 6F, some FLOAT8* accesses need to be rearranged. This is illustrated in FIG. 7D where swizzle circuitry 777 is configured (and/or commanded) to rearrange the bytes received from column decoders 755-758. Thus, precision configuration circuitry 727 configures (and/or commands) swizzle circuitry 777 as follows: byte 0 interface 770 receives/transmits the byte to/from W column decoder 755; byte 1 interface 771 receives/transmits the byte to/from Y column decoder 757; byte 2 interface 772 receives/transmits the byte to/from Y column decoder 757; byte 3 interface 773 receives/transmits the byte to/from Z column decoder 758.

It should be understood that the configurations of swizzle circuitry 777 are examples that depend both upon the format of the floating point numbers stored in memory arrays 751-754 (e.g., FLOAT32*, FLOAT16*, etc.) and the arrangement of those numbers in the arrays (e.g., non-contiguous stride, MSB first vs. non-first or last, etc.) Other configurations of swizzle circuitry 777 are contemplated.

In an embodiment, memory device 700 could transmit/receive W-, X-, Y- and Z-bytes that are not swizzled. In such an embodiment, the function of swizzle circuitry 777 may be implemented in a host system (e.g., in FP format processing block 215 or software.)

Figure 8A:
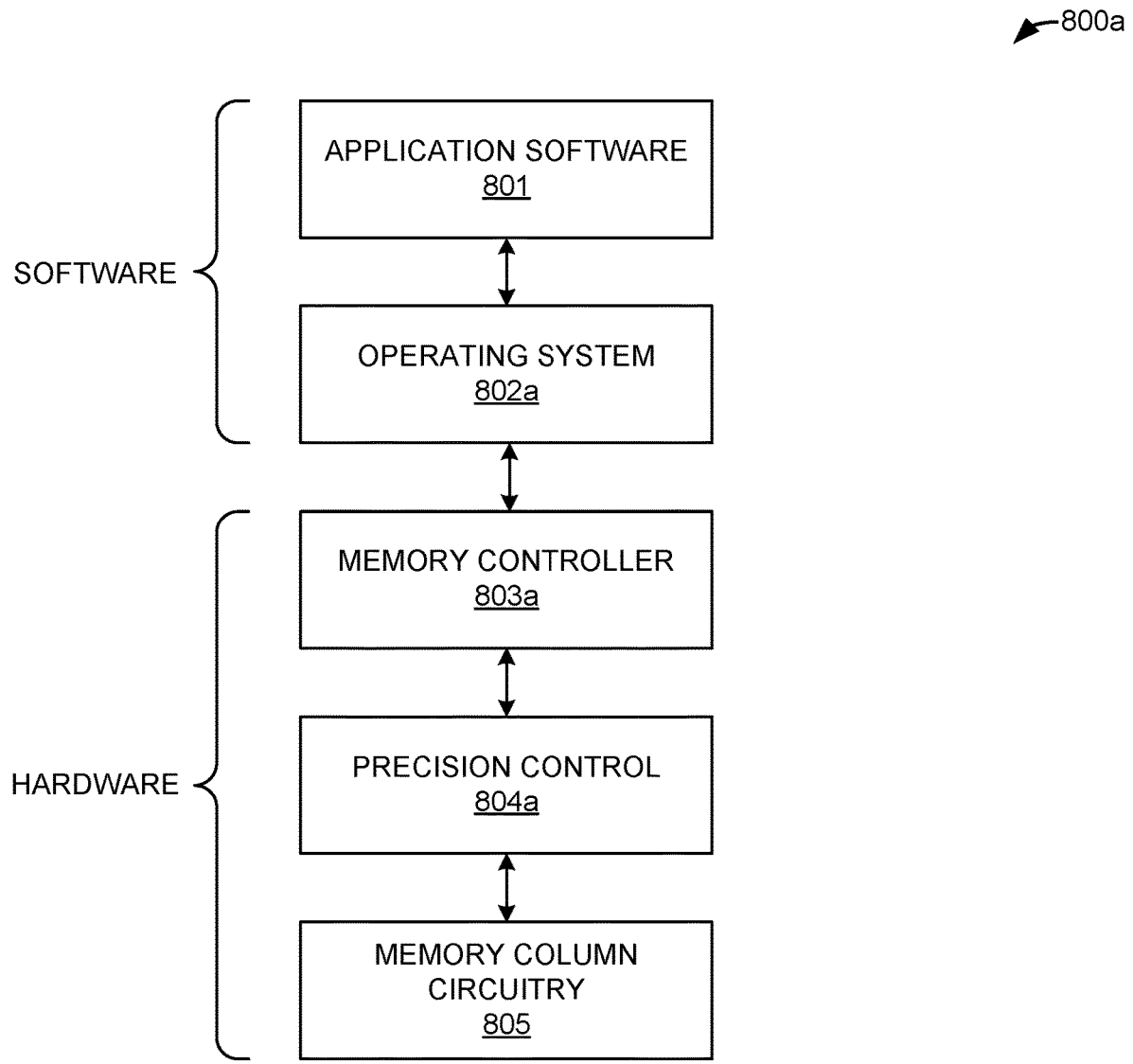
FIGS. 8A-8C are diagrams illustrating functional hierarchies to store/retrieve floating point numbers having different precisions.

FIG. 8A is a diagram illustrating a first example functional hierarchy to store/retrieve floating point numbers having different precisions. Application software 801 selects a precision for its calculations (e.g., FLOAT32*, FLOAT16*, etc.) and passes precision configuration information to the operating system 802a. The operating system 802a dynamically configures (and/or commands) memory controller 803a to operate using the specified precision. Memory controller 803a dynamically configures (and/or commands) precision control 804a and/or the memory column circuitry 805 (e.g., with offsets) to operate using the specified precision In an embodiment, memory controller 803a or a processor (not shown in FIG. 8A) may include a floating point format processor that is dynamically configured (and/or commanded) by operating system 802a to operate using a specified precision.

Figure 8B:
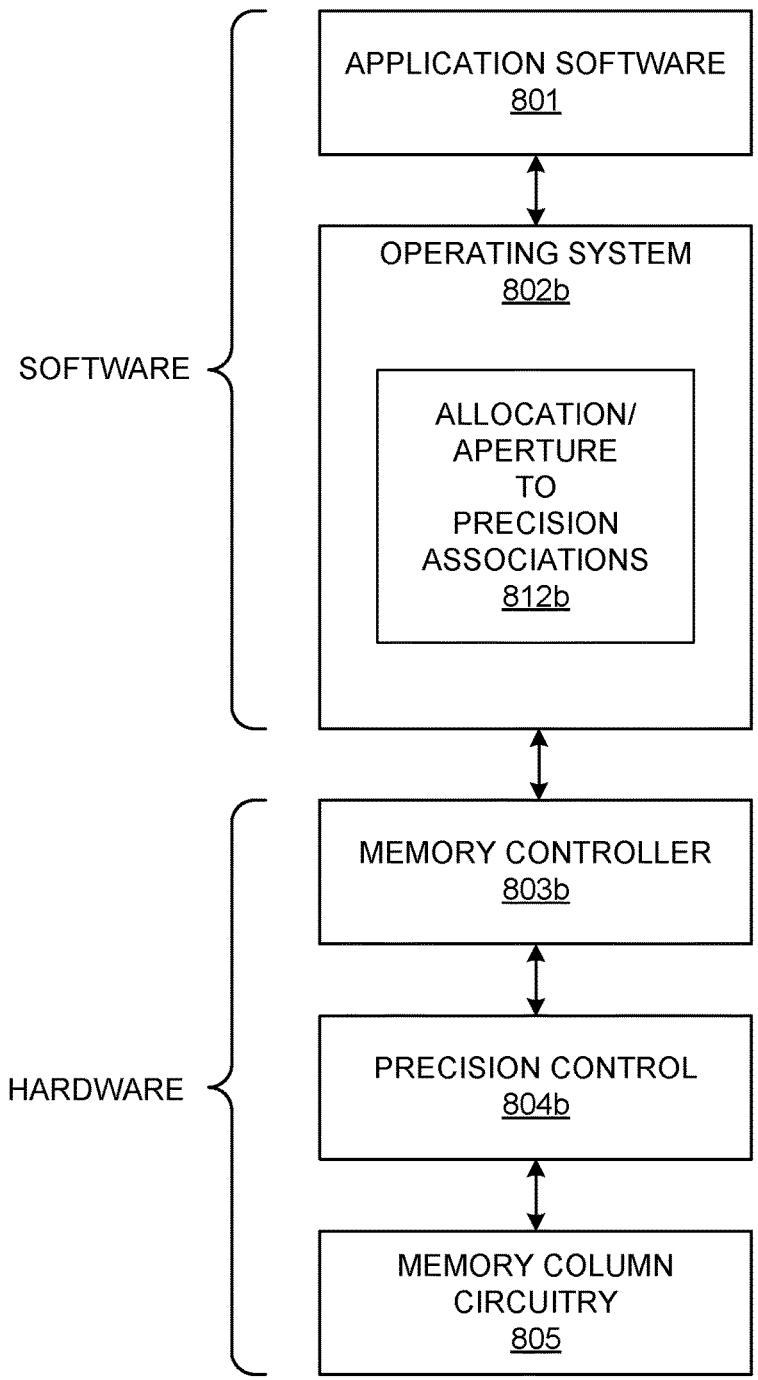

FIG. 8B is a diagram illustrating a second example functional hierarchy to store/retrieve floating point numbers having different precisions. Application software 801 selects a precision for its calculations (e.g., FLOAT32*, FLOAT16*, etc.) and passes precision configuration information to the operating system 802b. The operating system 802b dynamically configures (and/or commands) memory controller 803b to operate using the specified precision. Operating system 802b dynamically configures (and/or commands) memory controller 803b to operate using the specified precision based on an association 803b between memory allocations/apertures (e.g., memory pages, address ranges, etc.) and an associated precision to be used when storing/retrieving data from those respective allocations/apertures (e.g., a table.) Based on the precision information received from operating system 802b, memory controller 803b dynamically configures (and/or commands) precision control 804b and/or the memory column circuitry 805 (e.g., with offsets) to operate using the specified precision (e.g., until re-configured and/or commanded to use a different precision.)

Figure 8C:
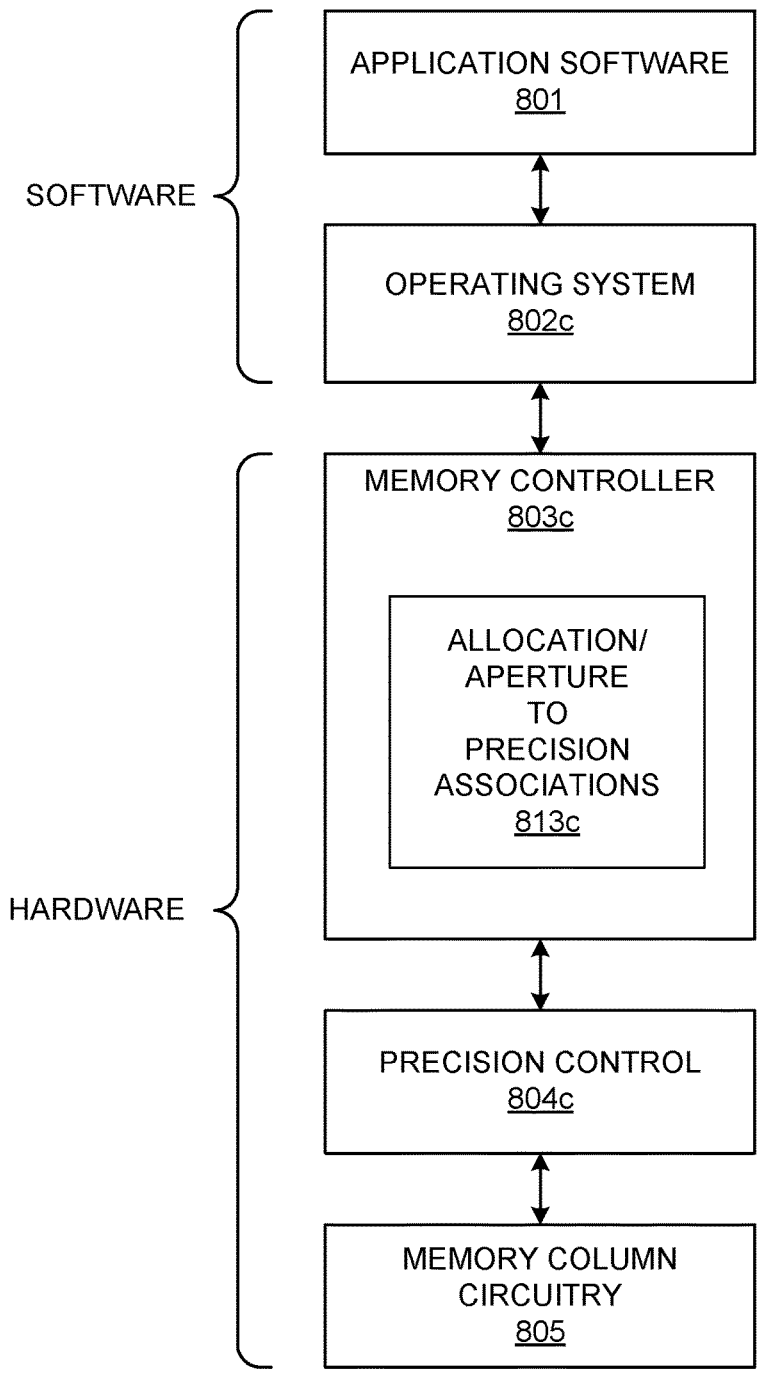

FIG. 8C is a diagram illustrating a third example functional hierarchy to store/retrieve floating point numbers having different precisions. Application software 801 selects a precision for its calculations (e.g., FLOAT32*, FLOAT16*, etc.) and passes precision configuration information to the operating system 802c. The operating system 802c dynamically configures (and/or commands) memory controller 803c to operate using the specified precision. Memory controller 803c dynamically configures (and/or commands) precision control 804c and/or the memory column circuitry 805 (e.g., with offsets) to operate using the specified precision (e.g., until re-configured and/or commanded to use a different precision.) Memory controller 803c dynamically configures (and/or commands) precision control 804c to operate using the specified precision based on an association between memory allocations/apertures (e.g., memory pages, address ranges, etc.) and an associated precision to be used when storing/retrieving data from those respective allocations/apertures (e.g., a table.)

Figure 9:
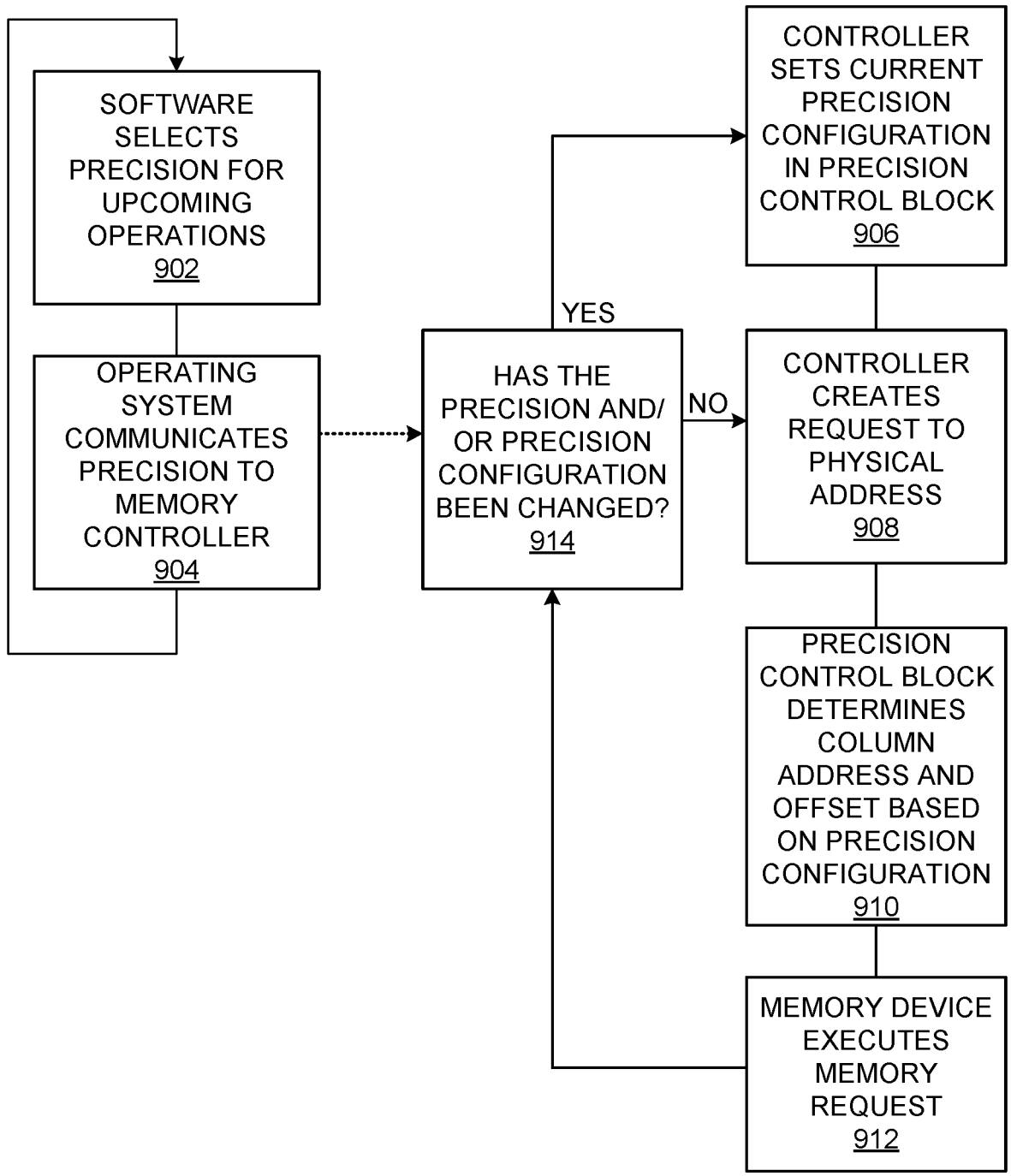
FIG. 9 is a flowchart illustrating a method of configuring the accessing of floating point numbers having different precisions.

FIG. 9 is a flowchart illustrating a method of configuring the accessing of floating point numbers having different precisions. The steps illustrated in FIG. 9 may be performed by one or more elements of system 200, system 800a, system 800b, and/or system 800c. Software selects a precision of upcoming operations (902). For example, application software 801 may select a precision for the operations it is going to perform. The operating system communicates the precision to the memory controller (904). For example, operating system 802a may dynamically configure (and/or command) memory controller 803a with information regarding the precision associated with an allocation of memory.

The memory controller sets the current precision in a precision control block (906). For example, memory controller 803a may dynamically configure (and/or command) precision control 804a with precision information. The memory controller creates a request to a physical address (908). For example, memory controller 803a may create a request to retrieve one or more floating point numbers from an allocation/aperture/range of memory that is associated with a given precision. The precision control block determines column address and column offset based on the precision configuration (910). For example, precision control 804a may determine column addresses and offsets based on the configured (and/or commanded) precision according to Table 1, Table 2, or Table 3. The memory device executes the request (912). Once the request is executed, the memory controller determines whether the precision and/or precision configuration has been changed (914). If not, flow proceeds to block 908. If the precision has been changed by the operating system, flow proceeds to block 906.

Figure 10:
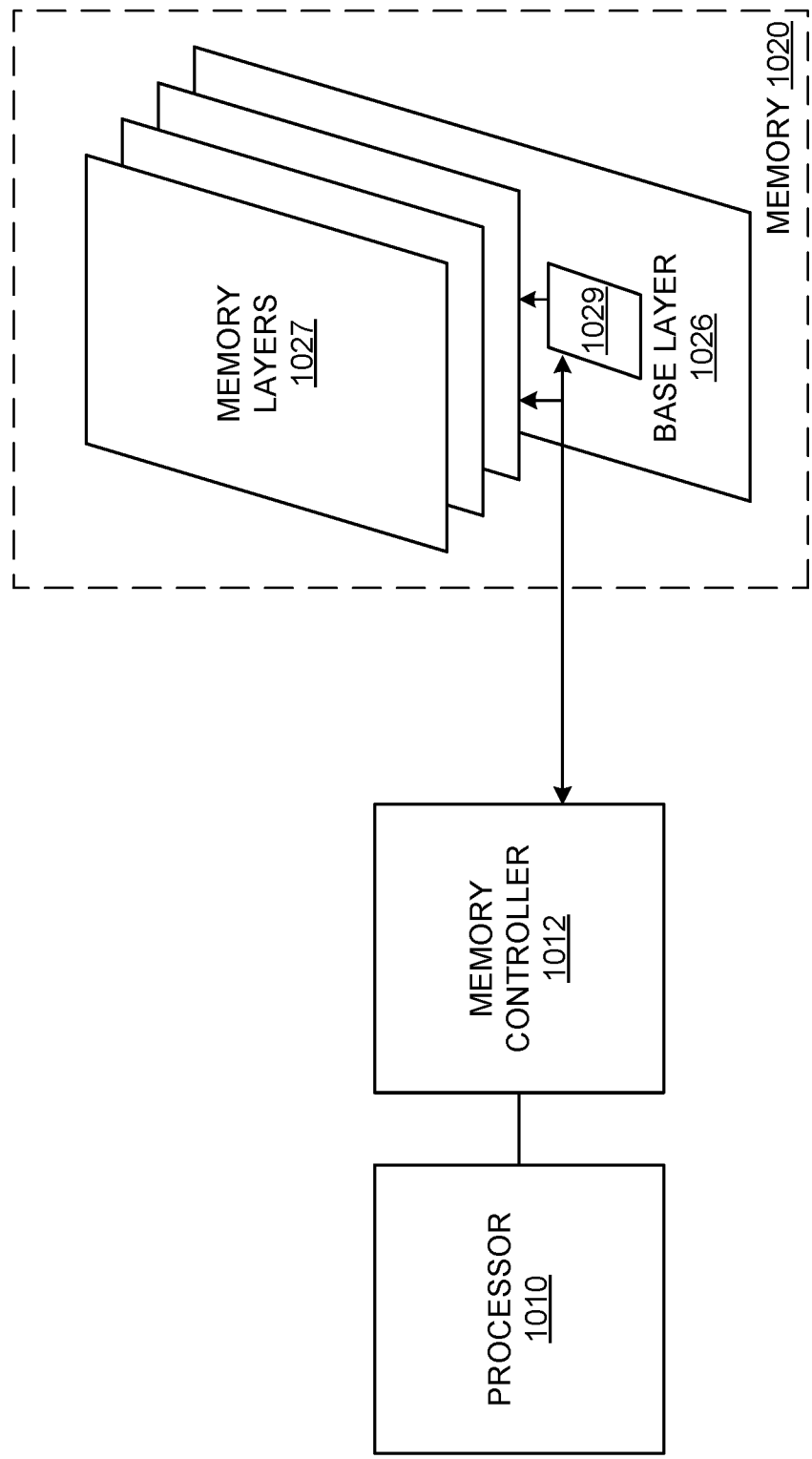
FIG. 10 is a block diagram of a processing system that uses a memory device stack for storing floating point numbers having different precisions.

FIG. 10 is a block diagram of a processing system that uses a memory device stack for storing floating point numbers having different precisions. In FIG. 10, system 1000 comprises processor 1010, memory controller 1012, and memory 1020. Memory 1020 includes a base layer 1026 and memory layers 1027. Base layer 1026 includes precision control block 1029. Processor 1010 is operatively coupled to memory controller 1012. Memory controller 1012 is operatively coupled to memory 1020. In particular, memory controller 1012 is operatively coupled to memory layers 1027 and precision control block 1029. Precision control block 1029 is also operatively coupled to memory layers 1027. Precision control block 1029 may be configured (and/or commanded) by memory controller 1012 with precision information (e.g., offsets and address stride). Precision control block 1029 may configure memory layers 1027 with offsets or other precision configuration information. Precision control block 1029 may generate the addresses sent to memory layers 1027 based on the precision configuration information.

Figure 11:
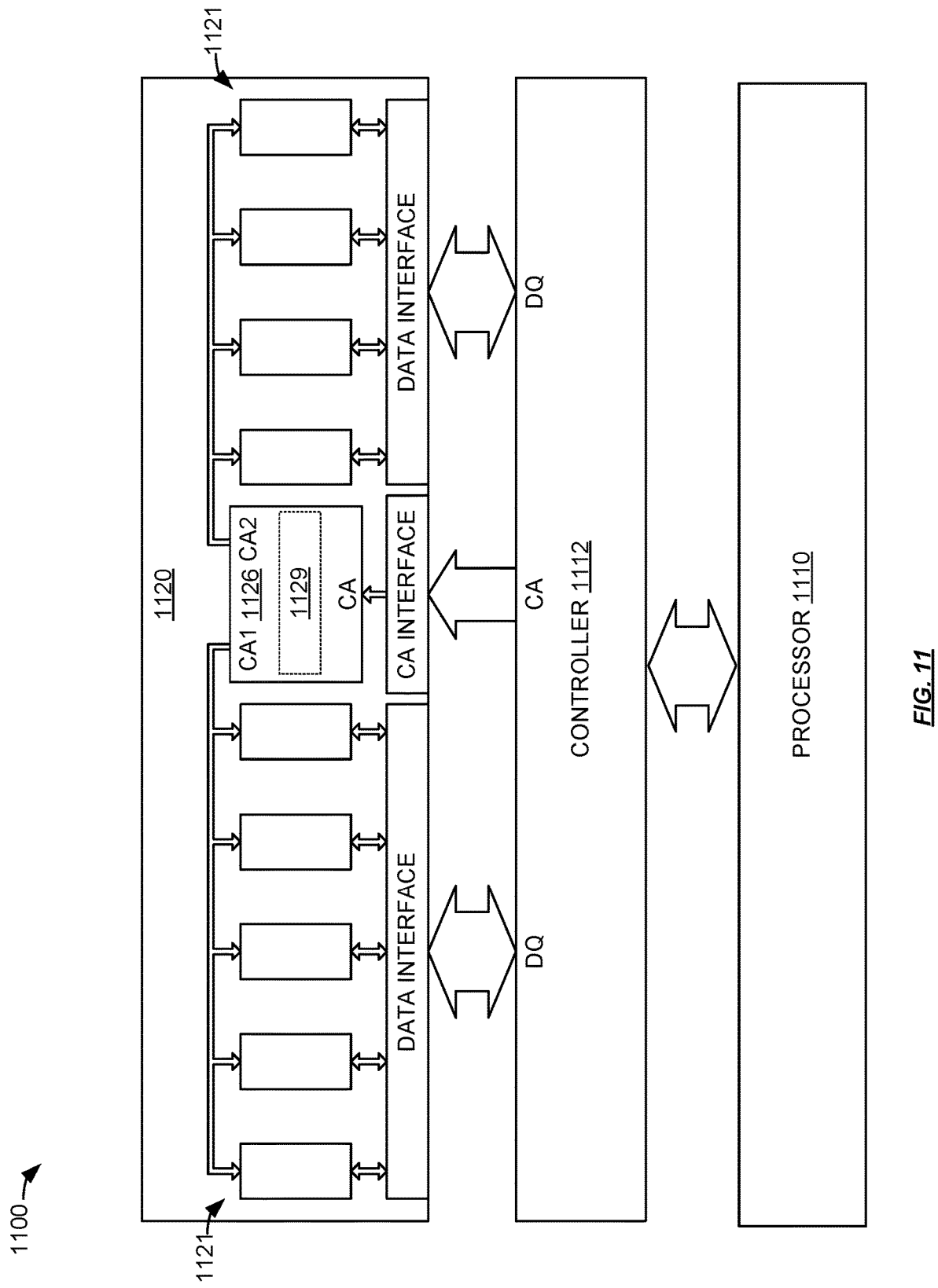
FIG. 11 is a block diagram of a processing system that uses a memory module for storing floating point numbers having different precisions.

FIG. 11 is a block diagram of a processing system that uses a memory module for storing floating point numbers having different precisions. In FIG. 11, system 1100 comprises processor 1110, memory controller 1112, and memory module 1120. Memory module 1120 includes memory devices 1121 and buffer 1126. Buffer 1126 includes precision control block 1129. Processor 1110 is operatively coupled to memory controller 1112. Memory controller 1112 is operatively coupled to module 1120. In particular, memory controller 1112 is operatively coupled to memory devices 1121 and buffer 1126. Buffer 1126 distributes commands and addressed to memory device 1121. Precision control block 1129 may be configured (and/or commanded) by memory controller 1112 with precision information (e.g., offsets and address stride). Precision control block 1129 may configure memory devices 1121 with offsets or other precision configuration information. Precision control block 1129 may generate the addresses sent to memory devices 1121 based on the precision configuration information.

Figure 12:
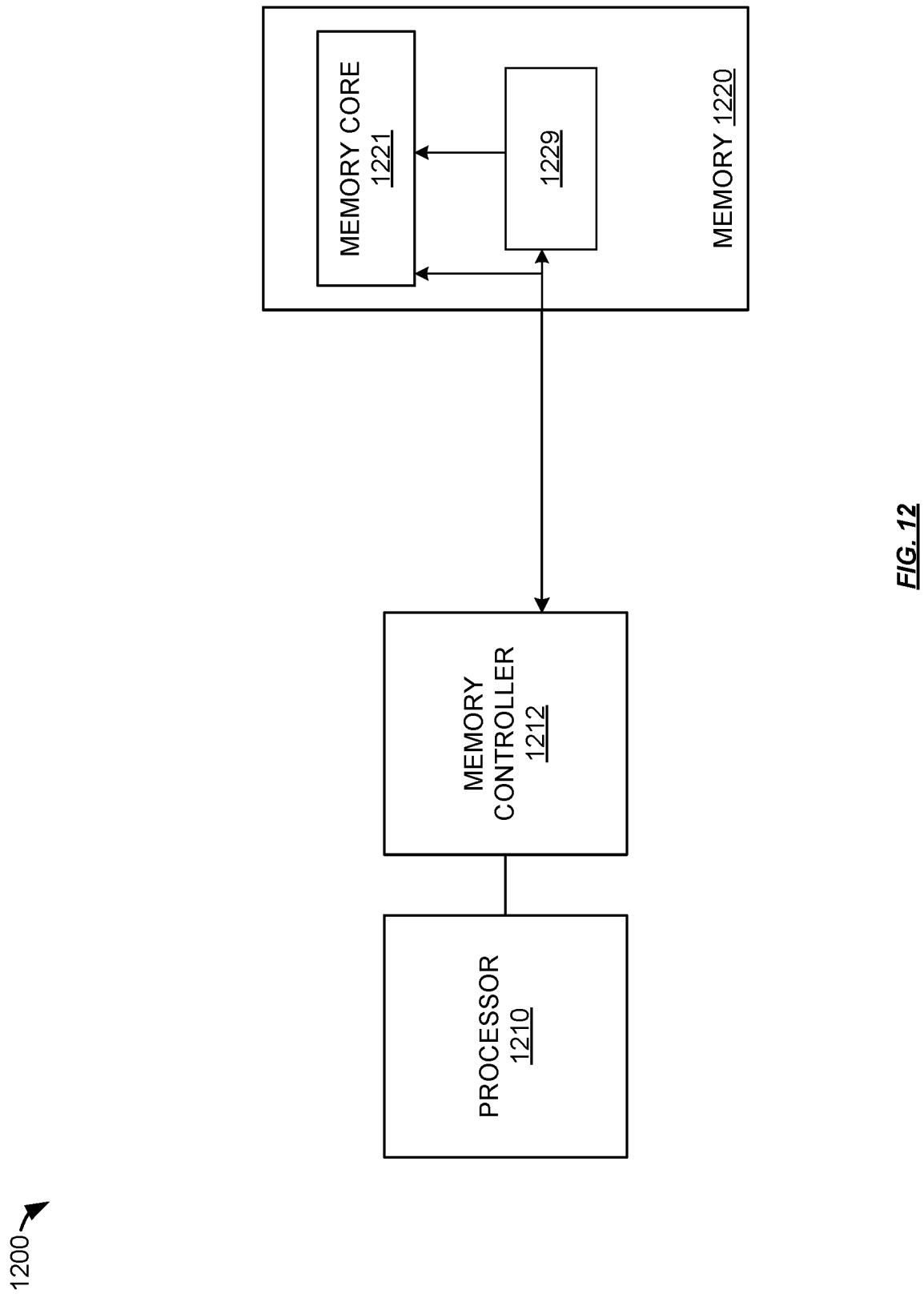
FIG. 12 is a block diagram of a processing system that uses directly attached memory devices for storing floating point numbers having different precisions.

FIG. 12 is a block diagram of a processing system that uses directly attached memory devices for storing floating point numbers having different precisions. In FIG. 12, system 1200 comprises processor 1210, memory controller 1212, and memory device 1220. Memory device 1220 includes precision control block 1229 and memory core 1221. Processor 1210 is operatively coupled to memory controller 1212. Memory controller 1212 is operatively coupled to memory device 1220. Precision control block 1229 may be configured (and/or commanded) by memory controller 1212 with precision information (e.g., offsets and address stride). Offsets or other precision configuration information may be used by precision control block 1229 may generate column addresses sent to memory cores 1221 based on the precision configuration information.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 200, device 700, system 800a, system 800b, system 800c, system 1000, system 1100, and/or system 1200, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 13:
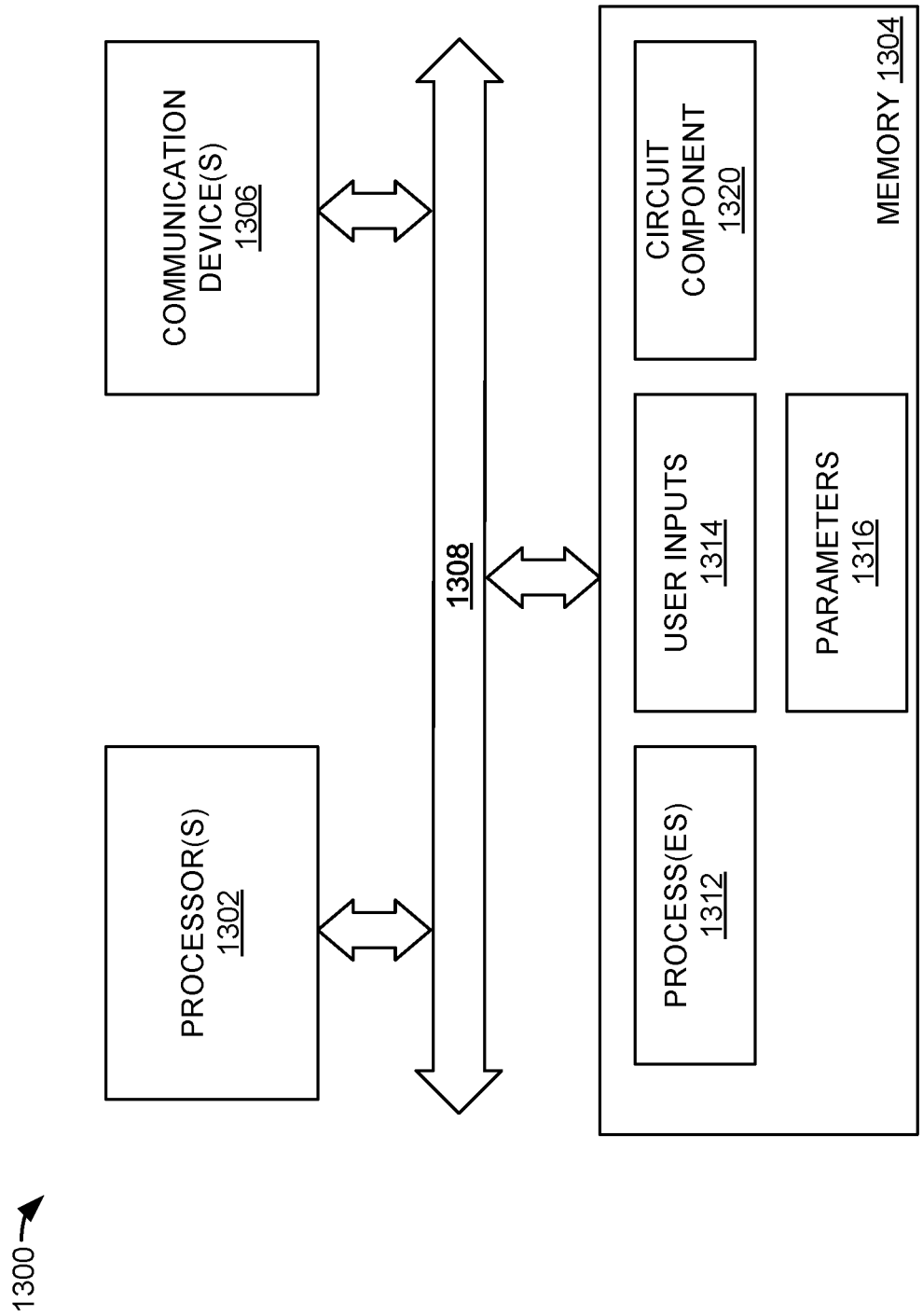
FIG. 13 is a block diagram of a processing system.

FIG. 13 is a block diagram illustrating one embodiment of a processing system 1300 for including, processing, or generating, a representation of a circuit component 1320. Processing system 1300 includes one or more processors 1302, a memory 1304, and one or more communications devices 1306. Processors 1302, memory 1304, and communications devices 1306 communicate using any suitable type, number, and/or configuration of wired and/or wireless connections 1308.

Processors 1302 execute instructions of one or more processes 1312 stored in a memory 1304 to process and/or generate circuit component 1320 responsive to user inputs 1314 and parameters 1316. Processes 1312 may be any suitable electronic design automation (EDA) tool or portion thereof used to design, simulate, analyze, and/or verify electronic circuitry and/or generate photomasks for electronic circuitry. Representation 1320 includes data that describes all or portions of system 200, device 700, system 800a, system 800b, system 800c, system 1000, system 1100, and/or system 1200, and their components, as shown in the Figures.

Representation 1320 may include one or more of behavioral, register transfer, logic component, transistor, and layout geometry-level descriptions. Moreover, representation 1320 may be stored on storage media or communicated by carrier waves.

Data formats in which representation 1320 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1314 may comprise input parameters from a keyboard, mouse, voice recognition interface, microphone and speakers, graphical display, touch screen, or other type of user interface device. This user interface may be distributed among multiple interface devices. Parameters 1316 may include specifications and/or characteristics that are input to help define representation 1320. For example, parameters 1316 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1304 includes any suitable type, number, and/or configuration of non-transitory computer-readable storage media that stores processes 1312, user inputs 1314, parameters 1316, and circuit component 1320.

Communications devices 1306 include any suitable type, number, and/or configuration of wired and/or wireless devices that transmit information from processing system 1300 to another processing or storage system (not shown) and/or receive information from another processing or storage system (not shown). For example, communications devices 1306 may transmit circuit component 1320 to another system. Communications devices 1306 may receive processes 1312, user inputs 1314, parameters 1316, and/or circuit component 1320 and cause processes 1312, user inputs 1314, parameters 1316, and/or circuit component 1320 to be stored in memory 1304.

Implementations discussed herein include, but are not limited to, the following examples:

Example 1: A memory device, comprising: a command interface to receive access commands that include information indicating a number of consecutive transactions to be performed in response to respective access commands; and, the number of consecutive transactions configurable to correspond to at least a first precision number format and a second precision number format.

Example 2: The memory device of example 1, wherein the number of consecutive transactions performed is higher for the first precision number format than the second precision format.

Example 3: The memory device of example 1, wherein the access commands include read commands and write commands.

Example 4: The memory device of example 3, wherein the write commands include information indicating a number of memory locations that are to be set to a selected value.

Example 5: The memory device of example 4 wherein the selected value is configurable in response to information received via the command interface.

Example 6: The memory device of example 5 wherein the selected value is stored in at least one register internal to the memory device.

Example 7: The memory device of example 4 wherein the selected value corresponds to zero.

Example 8: A method of accessing floating point numbers in a memory device, comprising: storing a first floating point number at a first precision by storing first multiple blocks of bits in first non-contiguously addressed locations, the first multiple blocks of bits including a first subset of the first multiple blocks of bits that correspond to a second precision version of the first floating point number; and, retrieving, from second non-contiguously addressed locations, a second floating point number that is the second precision version of the first floating point number by retrieving the first subset of the first multiple blocks of bits.

Example 9: The method of example 8, wherein the second precision is less than the first precision.

Example 10: The method of example 8, further comprising: storing a third floating point number at the first precision by storing second multiple blocks of bits in second non-contiguously addressed locations, the second multiple blocks of bits including a second subset of the second multiple blocks of bits that correspond to the second precision version of the third floating point number; and, retrieving, from third non-contiguously addressed locations, a fourth floating point number that is the second precision version of the second floating point number by retrieving the second subset of the second multiple blocks of bits.

Example 11: The method of example 10, wherein the second non-contiguously addressed locations are respectively contiguously addressed with the first non-contiguously addressed locations.

Example 12: The method of example 8, wherein the first multiple blocks of bits include a second subset of the first multiple blocks of bits that are set to a selected value.

Example 13: The method of example 12, wherein the selected value is configurable in response to information received via a command interface.

Example 14: The method of example 12, wherein the selected value corresponds to zero.

Example 15: A controller, comprising: access circuitry to receive, from at least one memory device and over a first plurality of consecutive memory transactions, a first plurality of floating point numbers, a first plurality of portions of the respective first plurality of floating point numbers to each be received from non-contiguously addressed locations with each of the first plurality of portions being received in response to different ones of the first plurality of consecutive memory transactions; and, floating point number assembly circuitry to receive the first portions of the respective first plurality of floating point numbers and to arrange the first portions of the respective first plurality of floating point numbers into the first plurality of floating point numbers.

Example 16: The controller of example 15, wherein floating point number assembly circuitry is configurable to arrange floating point numbers having at least a first precision and a second precision that is different from the first precision.

Example 17: The controller of example 15, further comprising: floating point number disassembly circuitry to receive a second plurality of floating point numbers and to transmit over a second plurality of consecutive memory transactions, a second plurality of portions of the respective second plurality of floating point numbers to each be stored in non-contiguously addressed locations with each of the second plurality of portions being transmitted as parts of different ones of the second plurality of consecutive memory transactions.

Example 18: The controller of example 17, further comprising: floating point number rounding circuitry to set a subset of the second plurality of portions of the respective second plurality of floating point numbers to a selected value.

Example 19: The controller of example 18, wherein the selected value is configurable in response to information received via a command interface.

Example 20: The controller of example 18, wherein the selected value corresponds to zero.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A memory device, comprising:
   a command interface to receive access commands that include information indicating a number of consecutive transactions to be performed in response to respective access commands, the access commands including read commands and write commands, the write commands including information indicating a number of memory locations that are to be set to a selected value; and,
   the number of consecutive transactions configurable to correspond to at least a first precision number format and a second precision number format.

2. The memory device of claim 1, wherein the number of consecutive transactions performed is higher for the first precision number format than the second precision format.

3. The memory device of claim 1, wherein the selected value corresponds to zero.

4. The memory device of claim 1, wherein the number of consecutive transactions configurable further correspond to at least a third precision number format.

5. The memory device of claim 1 wherein the selected value is configurable in response to information received via the command interface.

6. The memory device of claim 5 wherein the selected value is stored in at least one register internal to the memory device.

7. The memory device of claim 4 wherein the selected value corresponds to zero.

8. A method of accessing floating point numbers in a memory device, comprising:
   storing a first floating point number at a first precision by storing first multiple blocks of bits in first non-contiguously addressed locations, the first multiple blocks of bits including a first subset of the first multiple blocks of bits that correspond to a second precision version of the first floating point number; and,
   retrieving, from second non-contiguously addressed locations, a second floating point number that is the second precision version of the first floating point number by retrieving the first subset of the first multiple blocks of bits.

9. The method of claim 8, wherein the second precision is less than the first precision.

10. The method of claim 8, further comprising:
    storing a third floating point number at the first precision by storing second multiple blocks of bits in second non-contiguously addressed locations, the second multiple blocks of bits including a second subset of the second multiple blocks of bits that correspond to the second precision version of the third floating point number; and,
    retrieving, from third non-contiguously addressed locations, a fourth floating point number that is the second precision version of the second floating point number by retrieving the second subset of the second multiple blocks of bits.

11. The method of claim 10, wherein the second non-contiguously addressed locations are respectively contiguously addressed with the first non-contiguously addressed locations.

12. The method of claim 8, wherein the first multiple blocks of bits include a second subset of the first multiple blocks of bits that are set to a selected value.

13. The method of claim 12, wherein the selected value is configurable in response to information received via a command interface.

14. The method of claim 12, wherein the selected value corresponds to zero.

15. A controller, comprising:
    access circuitry to receive, from at least one memory device and over a first plurality of consecutive memory transactions, a first plurality of floating point numbers, a first plurality of portions of the respective first plurality of floating point numbers to each be received from non-contiguously addressed locations with each of the first plurality of portions being received in response to different ones of the first plurality of consecutive memory transactions; and,
    floating point number assembly circuitry to receive the first portions of the respective first plurality of floating point numbers and to arrange the first portions of the respective first plurality of floating point numbers into the first plurality of floating point numbers.

16. The controller of claim 15, wherein floating point number assembly circuitry is configurable to arrange floating point numbers having at least a first precision and a second precision that is different from the first precision.

17. The controller of claim 15, further comprising:
    floating point number disassembly circuitry to receive a second plurality of floating point numbers and to transmit over a second plurality of consecutive memory transactions, a second plurality of portions of the respective second plurality of floating point numbers to each be stored in non-contiguously addressed locations with each of the second plurality of portions being transmitted as parts of different ones of the second plurality of consecutive memory transactions.

18. The controller of claim 17, further comprising:
    floating point number rounding circuitry to set a subset of the second plurality of portions of the respective second plurality of floating point numbers to a selected value.

19. The controller of claim 18, wherein the selected value is configurable in response to information received via a command interface.

20. The controller of claim 18, wherein the selected value corresponds to zero.

\* \* \* \* \*